United States Patent [19]
Haran

[11] Patent Number: 6,072,461
[45] Date of Patent: Jun. 6, 2000

[54] APPARATUS AND METHOD FOR FACILITATING DOCUMENT GENERATION

[76] Inventor: Yossi Haran, Kibbutz, Eilon, Israel, 22845

[21] Appl. No.: 08/911,760

[22] Filed: Aug. 15, 1997

[51] Int. Cl.[7] ...................................................... G09G 5/34
[52] U.S. Cl. ........................................... 345/115; 345/157
[58] Field of Search .................................... 345/115, 116, 345/112, 113, 114, 121, 123, 124, 125, 141, 156, 157, 145, 146

[56] References Cited

U.S. PATENT DOCUMENTS

| | | |
|---|---|---|
| 4,475,239 | 10/1984 | van Raamsdonk . |
| 4,599,612 | 7/1986 | Kaji et al. . |
| 4,802,104 | 1/1989 | Ogiso . |
| 4,808,987 | 2/1989 | Takeda et al. . |
| 4,933,979 | 6/1990 | Suzuki et al. . |
| 5,101,447 | 3/1992 | Sokoloff et al. . |
| 5,434,932 | 7/1995 | Scott . |
| 5,455,901 | 10/1995 | Friend et al. . |
| 5,473,705 | 12/1995 | Abe et al. . |
| 5,500,937 | 3/1996 | Thompson-Rohrlich . |

Primary Examiner—Xiao Wu
Attorney, Agent, or Firm—Darby & Darby

[57] ABSTRACT

This invention discloses a method for displaying an image of an original document based on a digital representation of the original document, the method including displaying a first image of at least a portion of an original document to a typing operator, and displaying a second image of a typed-in interpretation of at least a portion of the original document, wherein the first and second images are simultaneously visible to the typing operator.

An apparatus for displaying an image of an original document based on a digital representation of the original document is also disclosed.

23 Claims, 33 Drawing Sheets

Microfiche Appendix Included
(3 Microfiche, 236 Pages)

Image Database

Object lists :

1) Word list :

| [Serial #] | [Xl, Yt] | [Xr, Yb] | [Cx, Cy] | [Offset] | [Line #] |
|---|---|---|---|---|---|
| [1] | [10, 5] | [18, 10] | [11, 8] | [ 310 ] | [1] |
| [2] | [25, 8] | [34, 11] | [31, 9] | [ 505 ] | [1] |
| [3] | [39, 8] | [44, 13] | [42,10] | [ 519 ] | [1] |
| [4] | [50, 6] | [60, 12] | [56,10] | [ 410 ] | [1] |
| [5] | [7, 15] | [18, 19] | [14,17] | [ 907 ] | [2] |
| [6] | [20, 15] | [26, 20] | [24,17] | [ 920 ] | [2] |
| [7] | [35, 17] | [44, 21] | [41,19] | [1055] | [2] |
| [8] | [4, 26] | [9, 29] | [7, 28] | [1564] | [3] |
| [9] | [13, 26] | [19, 31] | [16,30] | [1573] | [3] |
| [10] | [27, 27] | [47,31] | [38,30] | [1647] | [3] |
| [11] | [6, 38] | [15,43] | [12,41] | [2286] | [4] |
| [12] | [22, 38] | [33,42] | [29,41] | [2302] | [4] |

2) Line list :

| [Serial #] | [Xl, Yt] | [Xr, Yb] | [Skew] | [Offset] | [b] |
|---|---|---|---|---|---|
| [1] | [11, 8] | [60, 11] | [2.0] | [ 310 ] | [ 7 ] |
| [2] | [8, 17] | [46, 18] | [2.0] | [ 907 ] | [16] |
| [3] | [5, 29] | [48, 31] | [2.0] | [1564] | [28] |
| [4] | [7, 40] | [34, 41] | [2.0] | [2286] | [39] |

Attribute list :

| [objects dist (max),(min),(ave)] | [lines dist(max),(min),(ave)] |
|---|---|
| [ (9),(3),(6) ] | [ (13),(9),(11) ] |

*One ring to bring them all and in the darkness bind them*

↓
y (0,0)

→ x

↓
y

Adjustment database :

| [Words #] | [Correction] |
|---|---|
| [1] | [ 0 ] |
| [2] | [ 0 ] |
| [3] | [ 0 ] |
| [4] | [ 0 ] |
| [5] | [ 0 ] |
| [6] | [ 0 ] |
| [7] | [ 0 ] |
| [8] | [ 0 ] |
| [9] | [ 0 ] |
| [10] | [ 0 ] |
| [11] | [ 0 ] |
| [12] | [ 0 ] |

| [Line #] | [Correction] |
|---|---|
| [1] | [ 0 ] |
| [2] | [ 0 ] |
| [3] | [ 0 ] |
| [4] | [ 0 ] |

Fig 21A

Adjustment database :

| [Words #] | [Correction] |
|---|---|
| [1] | [ 0 ] |
| [2] | [ 0 ] |
| [3] | [ 0 ] |
| [4] | [ 0 ] |
| [5] | [+1] |
| [6] | [+1] |
| [7] | [+1] |
| [8] | [+1] |
| [9] | [+1] |
| [10] | [+1] |
| [11] | [+1] |
| [12] | [+1] |

| [Line #] | [Correction] |
|---|---|
| [1] | [ 0 ] |
| [2] | [ 0 ] |
| [3] | [ 0 ] |
| [4] | [ 0 ] |

Fig 21B

Adjustment database :

| [Words #] | [Correction] |
|---|---|
| [1] | [ 0 ] |
| [2] | [ 0 ] |
| [3] | [ 0 ] |
| [4] | [ 0 ] |
| [5] | [+1] |
| [6] | [+1] |
| [7] | [+1] |
| [8] | [+1] |
| [9] | [+1] |
| [10] | [+2] |
| [11] | [+2] |
| [12] | [+2] |

| [Line #] | [Correction] |
|---|---|
| [1] | [ 0 ] |
| [2] | [ 0 ] |
| [3] | [ 0 ] |
| [4] | [ 0 ] |

Fig 21C

Landmark database :

| [Serial #] | [input limits] | [Scroll offset] |
|---|---|---|
| [1] | [0 .. 10] | [10] |
| [2] | [11 .. 16] | [110] |
| [3] | [17 .. 22] | [200] |
| [4] | [22 .. 30] | [305] |
| [5] | [31 .. 38] | [403] |
| [6] | [39 .. 44] | [510] |
| [7] | [45 .. 50] | [613] |
| [8] | [51 .. 57] | [704] |

Fig 24

FAXSCANNER is a powerful tool for today's desk top publishers and for anyone using a scanning device or interested in acquiring one. Most scanners today are confined to one location.

FAXSCANNER was designed using the concept of the Mobile Office. From now on, you can thake youre scanner everywhere you go; since any fax machine you encounter on the road will become your scanner.

Fig 25

APPARATUS AND METHOD FOR FACILITATING DOCUMENT GENERATION

FIELD OF THE INVENTION

The present invention relates to apparatus and methods for typing a handwritten document and for performing similar tasks. This application includes a listing in the form of microfiche appendix A comprising 3 microfiche which contain a total of 236 frames.

BACKGROUND OF THE INVENTION

Operating systems, such as Microsoft's Windows '95, enable several applications to run at the same time, as well as to display a separate user interface window for each one.

Several software applications, such as Delrina's WinFax, enable displaying hand-written and other faxed documents. As described in the following excerpt from the Delrina's WinFax Pro user guide:

"Delrina Fax PRO provides sophisticated yet easy-to-use faxing capabilities for the Macintosh. With Delrina's Fax, you can send faxes to and receive faxes from any fax machine or fax/modem. You can quickly and easily send faxes from within Macintosh applications using the FaxWriter DA (Desk Accessory), or with FastFax. You can also automatically receive faxes, store them on your hard disk, view them at your convenience, convert them to editable text files, or forward them to another location, without ever having to print them."

Several OCR software applications, such as ExperVision's TypeReader, enable scanning a printed paper document and identifying alphanumerical characters therein in a process known as "optical character recognition". These applications also support proofreading tools which display the scanned and identified text, along with suspected erroneous characters next to the relevant scanned image, as described in the following excerpt from the TypeReader Pro user guide:

"The On-Screen Verifier is only available in the text view when the current page has been recognized and its page image is available.

The On-Screen Verifier is a pop-up window that displays the part of the page image corresponding to selected text.

This saves you the trouble of having to refer back to the hard copy of your document to see what was actually on the page.

When you use Proof to find and select a character or a word, the On-Screen Verifier is automatically displayed above the line containing the character or word. You can hide it by choosing Hide On-Screen Verifier from the Edit menu. When you've selected text manually, the On-Screen verifier is not automatically displayed. You can show it by choosing Show On-Screen verifier from the Edit menu."

The disclosures of all publications mentioned in the specification and of the publications cited therein are hereby incorporated by reference.

SUMMARY OF THE INVENTION

The present invention seeks to provide improved apparatus and methods for typing a hand-written document and for performing similar tasks.

There is thus provided, in accordance with a preferred embodiment of the present invention, a method for displaying an image of an original document based on a digital representation of the original document, the method including displaying a first image of at least a portion of an original document to a typing operator, and displaying a second image of a typed-in interpretation of at least a portion of the original document, wherein the first and second images are simultaneously visible to the typing operator.

Further in accordance with a preferred embodiment of the present invention, the method also includes generating a digital representation of the original document.

Still further in accordance with a preferred embodiment of the present invention, the step of generating a digital representation includes the step of scanning the original document.

Further in accordance with a preferred embodiment of the present invention, the step of generating a digital representation includes the step of digitally photographing the original document.

Still further in accordance with a preferred embodiment of the present invention, the step of displaying a second image includes simultaneously displaying a second image of a typed-in interpretation of at least a portion of the original document on the same screen on which the first image is being displayed.

Also provided, in accordance with another preferred embodiment of the present invention, is apparatus for displaying an image of an original document based on a digital representation of the original document, the apparatus including an original document display generator operative to display a first image of at least a portion of an original document to a typing operator, and an interpretation display generator operative to display a second image of a typed-in interpretation of at least a portion of the original document, wherein the first and second images are simultaneously visible to the typing operator.

Further in accordance with a preferred embodiment of the present invention, the apparatus also includes a digitizing tablet for generating the document wherein a digital output representing the document is provided by the digitizing tablet to the original document display generator.

Still further in accordance with a preferred embodiment of the present invention, the document includes a handwritten document.

Further in accordance with a preferred embodiment of the present invention, the apparatus also includes a typing process manager operative to store a representation of at least a portion of the original document in association with a representation of at least a portion of the typed-in interpretation of at least a portion of the original document.

Also provided, in accordance with a preferred embodiment of the present invention, is apparatus for monitoring a user's progress in processing a first sequence of information elements relative to a matching second sequence of information elements, the apparatus including a tracker operative to automatically track a user's progress in inputting a first sequence of information elements thereby to monitor the user's current location within the first sequence, and a matching location display generator operative to receive information regarding the user's current location in the first sequence from the tracker, to identify a matching location within the second sequence which matches the current location within the first sequence, and to display the matching location.

Further in accordance with a preferred embodiment of the present invention, the apparatus also includes a scroller operative to scroll the first image in response to input other than a keyed-in scroll command Still further in accordance with a preferred embodiment of the present invention, the scroller is operative in response to a voice command.

Additionally in accordance with a preferred embodiment of the present invention, the scroller is operative in response to a non-manual scroll command.

Still further in accordance with a preferred embodiment of the present invention, the non-manual scroll command includes a foot-activated command.

Also provided, in accordance with another preferred embodiment of the present invention, is apparatus for monitoring a user's progress in processing a first sequence of information elements relative to a matching second sequence of information elements, the apparatus including a tracker operative to automatically track a user's progress in inputting a first sequence of information elements thereby to monitor the user's current location within the first sequence, and a matching location display generator operative to receive information regarding the user's current location in the first sequence from the tracker, to identify, without relying on recognition of information elements, a matching location within the second sequence which matches the current location within the first sequence, and to display the matching location.

Further in accordance with a preferred embodiment of the present invention, the matching location display generator is operative to receive corrective input from a user and to identify the matching location by adjusting the information regarding the user's current location to take into account the corrective input.

Still further in accordance with a preferred embodiment of the present invention, the matching location display generator is operative, in response to a user's command, to display at least a portion of the second sequence of information including the matching location.

Additionally in accordance with a preferred embodiment of the present invention, the matching location display generator is operative to constantly display at least a portion of the second sequence of information including the matching location.

Still further in accordance with a preferred embodiment of the present invention, the original document display generator includes a tracker operative to track the typing operator's progress in typing in the original document, and a matching location display generator operative to receive information regarding the operator's progress from the tracker, to find a current location within the original document which the operator is currently typing in and to display a portion of the original document which includes the current location.

Further in accordance with a preferred embodiment of the present invention, the tracker tracks a user's progress in processing the first sequence of information elements at least partly by counting the information elements without relying on recognition of the information elements which may include words and/or characters and/or sets of characters such as lines or paragraphs.

Still farther in accordance with a preferred embodiment of the present invention, each set of characters includes a field and each sequence of information elements includes a spreadsheet.

Further in accordance with a preferred embodiment of the present invention, the first sequence of information elements includes a text document and the second sequence of information elements includes a graphic image.

Still further in accordance with a preferred embodiment of the present invention, the matching location display generator includes apparatus for moving a cursor through the second sequence.

Additionally in accordance with a preferred embodiment of the present invention, the user employs a software application to process the first sequence and the tracker includes an application interface operative to elicit, from the application, information regarding the user's progress within the first sequence of information elements.

Further in accordance with a preferred embodiment of the present invention, the user employs an input device to express commands which define a desired process to be performed on the first sequence and wherein the tracker includes an input device interface for interfacing with the input device and receiving information therefrom regarding the commands.

Also provided, in accordance with another preferred embodiment of the present invention, is a method for facilitating document generation, the method including displaying original contents of a source document, adding contents to the source document by inputting a sequence of user-generated input elements into the source document, and generating a new document including only the sequence of user-generated input elements without the original contents.

Further in accordance with a preferred embodiment of the present invention, the adding step includes adding a subsequence of user-generated input elements to the source document which corresponds to a portion of the original contents, at a location adjacent to the location of the portion of the original contents.

Also provided in accordance with another preferred embodiment of the present invention, is a document input system operative in conjunction with a document input application, the system including a document display device operative to display at least a portion of a graphically represented source document, and a user input responsive display controller operative to control the document display device responsive to inputting of a user-generated document.

Further in accordance with a preferred embodiment of the present invention, the system also includes a document scanner operative to generate the graphically represented source document from a hard copy document.

Still further in accordance with a preferred embodiment of the present invention, the user input responsive display controller includes a scroller selecting the portion of the graphically represented source document displayed by the document display device wherein the scroller is operative to scroll the source document responsive to inputting of the user-generated document.

Additionally in accordance with a preferred embodiment of the present invention, the user input responsive display controller includes a cursor mover operative to move a cursor through the source document wherein the document display device is operative to superimpose the cursor in its current position onto the portion of the graphically represented source document which is being displayed.

Further in accordance with a preferred embodiment of the present invention, the graphically represented source document contains the same information as the user-generated document.

Still further in accordance with a preferred embodiment of the present invention, the user-generated document does not contain the same information as the graphically represented source document but is derived therefrom.

Additionally in accordance with a preferred embodiment of the present invention, the user-generated document includes a translation of the graphically represented source document into another language.

Additionally in accordance with a preferred embodiment of the present invention, the user input responsive display controller includes a cursor mover operative to move a cursor through the graphically represented document wherein the document display device is operative to superimpose the cursor in its current position onto the portion of the graphically represented document which is being displayed.

Further in accordance with a preferred embodiment of the present invention, the source document includes a handwritten text and wherein the application includes a word-processor.

Still further in accordance with a preferred embodiment of the present invention, the document display device is operative to simultaneously display at least a portion of the user-generated document and at least a corresponding portion of the graphically represented source document.

Also provided, in accordance with another preferred embodiment of the present invention, is a document input system operative in conjunction with an application used to input a user-generated document and a document display device operative to display at least a portion of a graphically represented source document, the system including a user input responsive display controller operative to control the document display device responsive to inputting of the user-generated document, wherein the user input responsive display controller includes a scroller determining the portion of the graphically represented document displayed by the document display device -wherein the scroller is operative to scroll the graphically represented document responsive to inputting of the user-generated document, and a cursor mover operative to move a cursor through the graphically represented document wherein the document display device is operative to superimpose the cursor in its current position onto the portion of the graphically represented document which is being displayed.

Still further in accordance with a preferred embodiment of the present invention, the user input responsive display controller includes an optical character recognizer operative to optically recognize characters in the user-generated document.

Additionally in accordance with a preferred embodiment of the present invention, the user input responsive display controller includes a counter operative to identify and count objects inputted into the user-generated document. The objects may include words, spaces, rows, cells within a table, cells within a spreadsheet and the like.

Further in accordance with a preferred embodiment of the present invention, the step of adding a subsequence includes the step of displaying each subsequence of user-generated input elements corresponding to a line of original contents adjacent to the line.

Still further in accordance with a preferred embodiment of the present invention, the subsequence of user-generated input elements corresponding to a line of original contents is displayed in a space between the line and an adjacent line.

Additionally in accordance with a preferred embodiment of the present invention, the display controller is operative to select the portion of the graphically represented source document to be displayed by the document display device responsive to inputting of the user-generated document and to a between-language factor indicating the average ratio between the number of words in a typical document in the language of the graphically represented source document and the number of words in a document which is a translation of the typical document into the language of the user-generated document.

Further in accordance with a preferred embodiment of the present invention, the matching location display generator includes a learning capability operative to use corrective input from a user, pertaining to an incorrect match between the user's current location in the first sequence and an identified matching location in the second sequence, in order to improve future incorrect matches between subsequent locations of the user in the first sequence and subsequent identified matching locations in the second sequence.

Still further in accordance with a preferred embodiment of the present invention, the user input responsive display controller includes a document input application interface operative to receive, from the document input application, information pertaining to a user's progress in inputting the user-generated document and to select the portion of the graphically represented source document to be displayed by the document display device, at least partly based on the information.

Further in accordance with a preferred embodiment of the present invention, the user-generated document is inputted by a user using an input device and wherein the user input responsive display controller includes an input device interface operative to capture, from the input device, information pertaining to a user's progress in inputting the user-generated document and to select the portion of the graphically represented source document to be displayed by the document display device, at least partly based on the information.

Still further in accordance with a preferred embodiment of the present invention, the source document is in a first language and the user-generated document is in a second language and wherein user input responsive display controller includes an automatic translator operative to generate a translation of the user-generated document into the first language, and a document synchronizer operative to synchronize the documents based at least partly on the translation.

Further in accordance with a preferred embodiment of the present invention, the user input responsive display controller includes a scrolling monitor operative to monitor a user's manual scrolling operations, and a scrolling operation learner operative to compare the manual scrolling operations with information pertaining to the user's progress in inputting the user-generated document and to learn a relationship between the rate at which the graphically represented source document should be scrolled and the rate at which the user inputs the user-generated document.

The user generated document may include a database.

Further in accordance with a preferred embodiment of the present invention, the user input responsive display controller includes a document location analyzer operative to compare a relative location of an object which is now being inputted in the user-generated document to the location of the same object in the source document.

Still further in accordance with a preferred embodiment of the present invention, the tracker is operative to automatically track the user's progress without employing user-supplied information other than the first sequence of information elements.

Additionally in accordance with a preferred embodiment of the present invention, the first sequence of information elements includes a user-generated sequence of information elements.

Still further in accordance with a preferred embodiment of the present invention, the user input responsive display controller includes a scrolling monitor operative to monitor a user's manual scrolling operation which causes a current portion of the source document to be displayed and to associate the current portion, in memory, with a current location in the user-generated document, and a manual scrolling responsive display controller operative to cause the document display device to display the current portion of the source document when the current location in the user-generated document is returned to.

The term "document" is intended to include text documents as well as non-text documents such as databases, spreadsheets, and representations of graphic images.

The term "scrolling", as used herein, includes displaying a first screen/display window's worth of a document which is more than one screen/display window long and subsequently displaying a second screen/display window's worth of the document which is not identical to the first screen/display window although the two may overlap. Scrolling may or may not include adjustment of the cursor position.

Scrolling may be based on a counting process which matches a counting process performed during tracking. For example, the number of typed letters, words or lines may be counted by the tracker and the same quantity may be counted out by the scroller. For example, if the tracker finds that 215 letters, or 17 words, or 4 lines have been processed, the source document image would then be scrolled to a vicinity of the 216th letter, or 18th word, or 5th line, respectively, after performing the object identification method of FIG. 5 to identify all letters, words or lines, respectively, in the source document image. The cursor would typically be set on the 216th letter, or 18th word, or 5th line, respectively.

If the document is a spreadsheet or has a tabular structure, rather than being a text document or other document which is sequential in character, then instead of counting, the relative location of the object currently being processed may be employed. For example, if the tracker indicates that the user is now keying within the third field of the fourth row, then the scroller similarly proceeds to the third field of the fourth row within the source document.

BRIEF DESCRIPTION OF THE DRAWINGS AND APPENDICES

The present invention will be understood and appreciated from the following detailed description, taken in conjunction with the drawings and appendices in which:

FIG. 1A is a prior art figure illustrating a secretary typing a handwritten hard copy document clipped onto a stand;

FIG. 1B is a pictorial illustration of apparatus constructed and operative in accordance with a preferred embodiment of the present invention in which a display of a handwritten text is provided, e.g. by scanning in the handwritten text, and in which the handwritten text is scrolled such that the portion thereof which is included in the display window corresponds to the secretary's progress in typing;

FIG. 18 is a pictorial illustration of the contents of an source document image database for a handwriting sample illustrated in FIG. 19;

FIG. 21A is a diagram of an adjustment database;

FIG. 21B is a diagram of the adjustment database of FIG. 21A after a user has requested that the source document cursor position be corrected by advancing one object forward, from Object No. 5 to the user's present location at Object No. 6;

FIG. 21C is a diagram of the adjustment database of FIG. 21B after a user has made an additional source document cursor position correction request, namely that the cursor advance one more object forward, from Object No. 10 to the user's present location at Object No. 11;

FIG. 24 is an illustration of a landmark database useful particularly when the system shown and described herein is operating in Landmark sub-mode; and FIG. 25 is an example of an input hand-written source document which can be processed by the computer program of Appendix A.

Attached herewith are the following appendices which aid in the understanding and appreciation of one preferred embodiment of the invention shown and described herein:

Microfiche Appendix A is a computer listing of a software implementation of an information sequence synchronization and display system constructed and operative in accordance with a preferred embodiment of the present invention.

DETAILED DESCRIPTION OF PREFERRED EMBODIMENTS

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

Figure 1A:
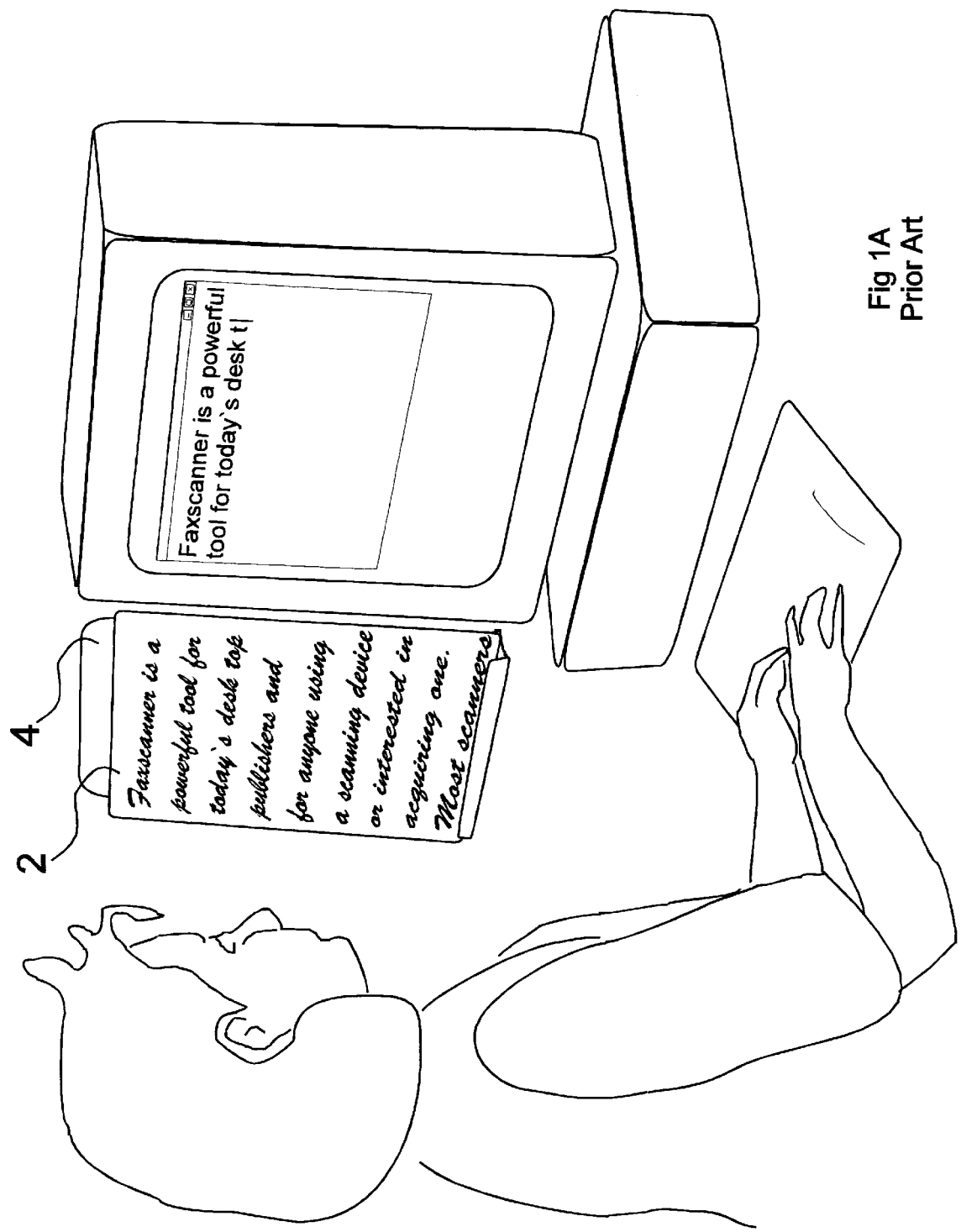
FIG. 1C is a simplified block diagram of an information sequence synchronization and display system constructed and operative in accordance with a preferred embodiment of the present invention.

FIG. 1A is a prior art figure illustrating a secretary typing a handwritten hard copy document 2, clipped onto a stand 4.

Figure 1B:
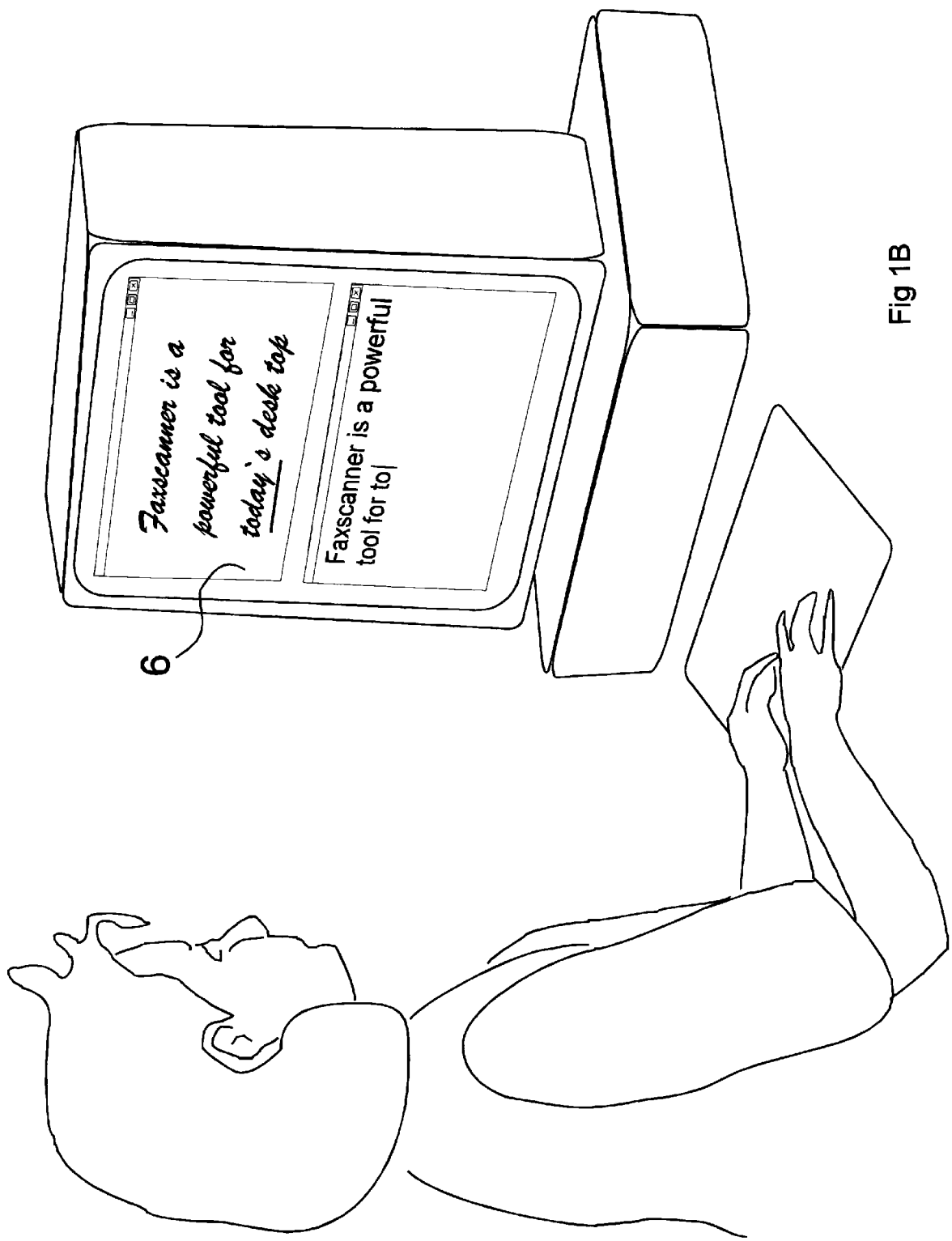

FIG. 1B is a pictorial illustration of apparatus constructed and operative in accordance with a preferred embodiment of the present invention in which a display 6 of the handwritten text is provided, e.g. by scanning in the handwritten text. The handwritten text is scrolled such that the portion thereof which is included in the display window 6 corresponds to the secretary's progress in typing. For example, in the illustration, the secretary has typed "Faxscanner is a powerful tool for" and is in the course of typing the next word, "today's". The handwritten text has been scrolled to the vicinity of the word "today" and the cursor is pointing to the word "today's".

Figure 1C:
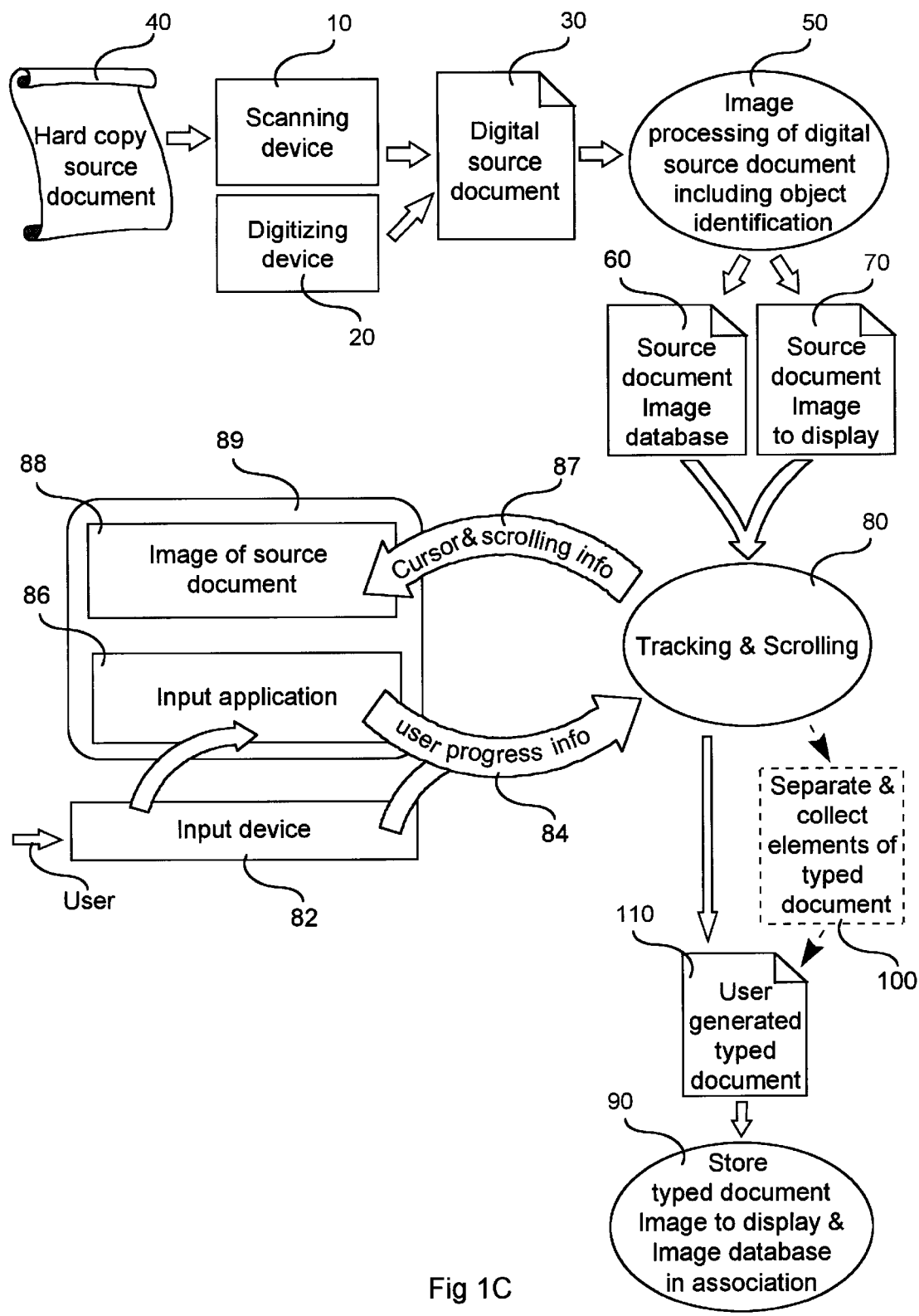

FIG. 1C is a simplified block diagram of an information sequence synchronization and display system constructed and operative in accordance with a preferred embodiment of the present invention. The system of FIG. 1C includes a scanning device 10, which may be a flatbed scanner such as a ScanJet 4s by Hewlett Packard, or a digitizing device 20, such as an ArtPad II by Wacom Computer Systems. Device 10 or device 20 are both operative to generate a graphics representation 30, such as a bitmap representation, of an original or source document 40 which is typically a hard copy and may for example be a handwritten paper. Although the source document need not necessarily comprise a handwritten document, the present specification refers to the source document on occasion as "the handwritten document", for clarity.

Figure 15A:
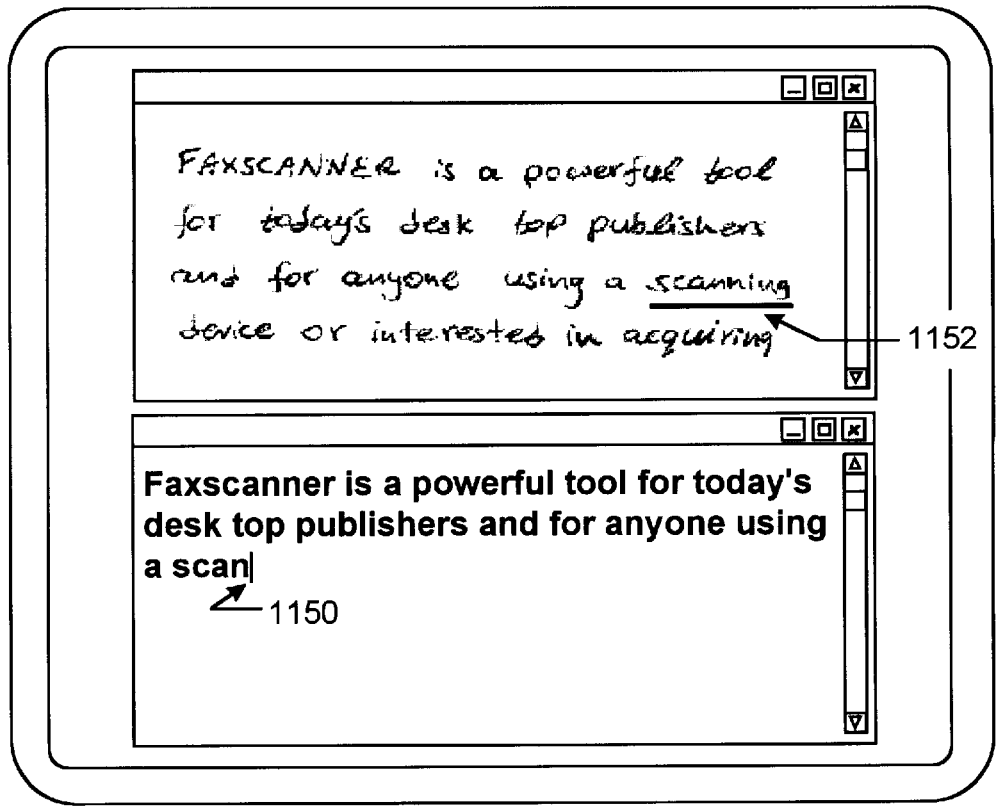
FIG. 15A is an example of a screen display generated by a information sequence synchronization and display system constructed and operative in accordance with a preferred embodiment of the present invention which system is particularly suited to facilitating the process of typing handwritten documents.
Figure 15B:
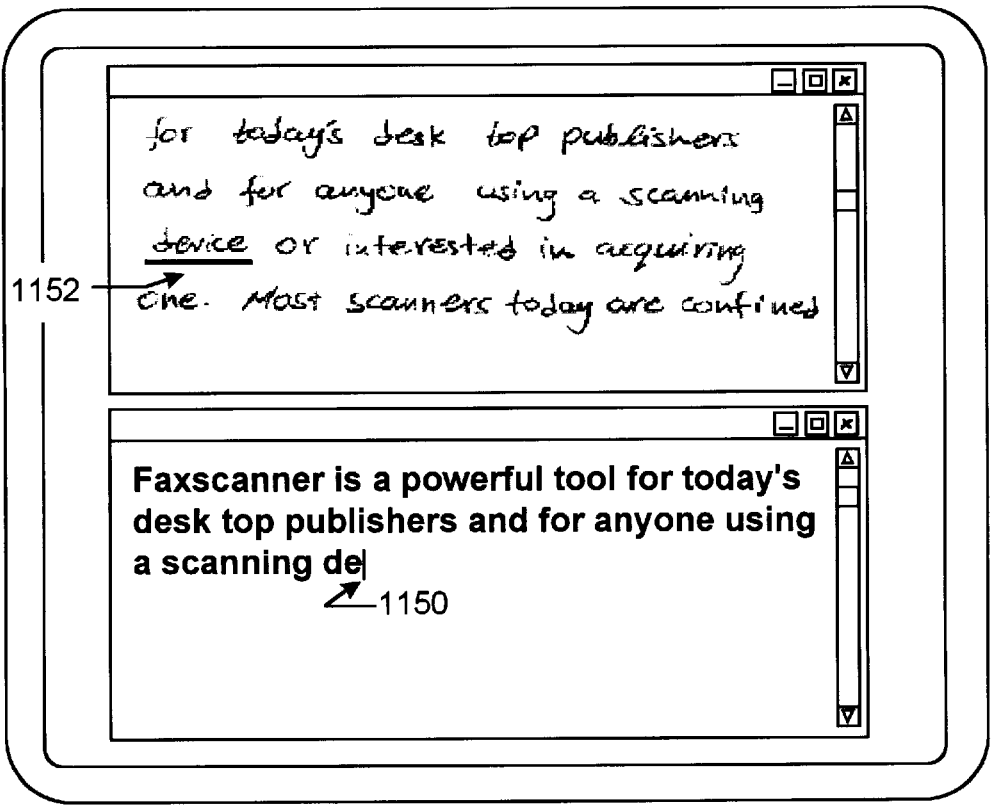
FIG. 15B is an example of a subsequent display generated by the same system after the user has typed the word "scanning" and has begun typing the next word, "device"
Figure 15C:
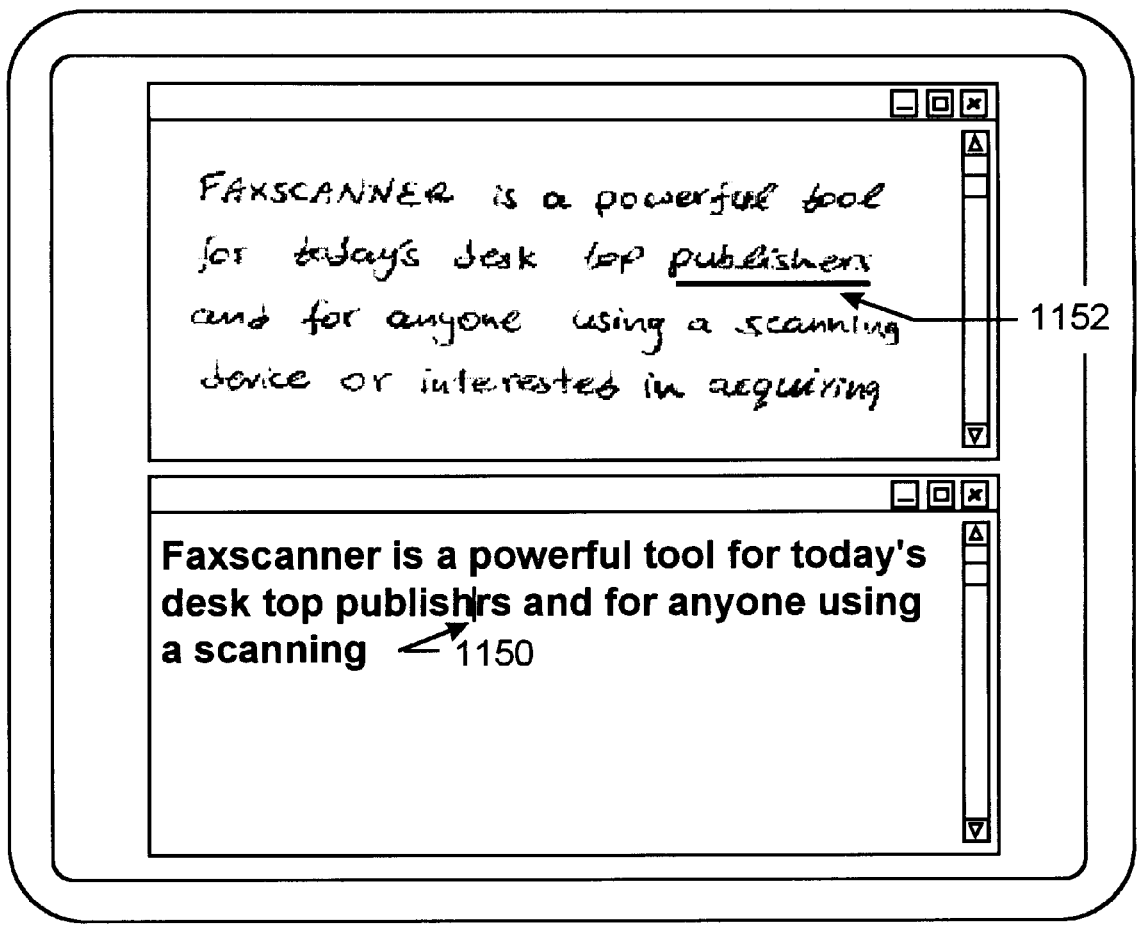
FIG. 15C is an example of a subsequent display generated by the system of FIGS. 15A and 15B for an example in which the insertion point has been moved back, by the user, to a earlier location within the user-generated document in order to correct existing text.

A source document image processing unit 50 is operative to analyze the graphics representation 30 and to identify objects therein, such as words, lines, columns, cells and/or paragraphs. The source document image processing unit 50 is described in detail below with reference to FIG. 2. The output of the source document image processing unit 50 preferably includes a source document image database 60 storing at least one characteristic of objects identified in the source document. An example of contents of source document image database 60 is illustrated in FIG. 18. The output of unit 50 also preferably includes a image 70 to be displayed of at least a portion of the source document 30 as illustrated in FIGS. 15A–15C.

The output of source document image processing unit 50 is fed to a tracking and scrolling unit 80 which is operative to track a user's progress through a first sequence of information and scroll the second sequence of information accordingly. The tracking and scrolling unit 80 typically performs the following operations:

a. tracking the user's location within a user-generated document, typically by identifying that the user's location has changed and if so, quantifying the extent of the change.

b. identifies a corresponding location within a source document by synchronizing the source document to the user-generated document using any suitable synchronization method and c. scrolls the source document to display that corresponding location.

For example, the user-generated document may comprise a typed version of a source document which is hand-written. A suitable input device 82 such as a keyboard and/or mouse may be used to key in the user-generated document. The tracking/scrolling unit 80 may track the user's progress in generating the user-generated document 110, e.g. by obtaining user progress information 84 directly from an input application 86 in which the user is working, or alternatively by analyzing the operation of the input device 82. The tracking/scrolling unit 80, typically after "mapping" or learning the relevant attributes of the entire source document 40 as described below with reference to FIG. 2, scrolls to an appropriate location within the source document 40 and adds suitable cursor and scrolling information 87 to a display 88 of the source document image 70, which appears on a display 89 such as the display screen of a computer.

Once tracking has ceased, the source document image database 60 and source document image-to-display 70 are preferably stored in association with the user-generated document 110, to facilitate subsequent proofreading operations or other operations in which the two documents are compared.

Figure 23A:
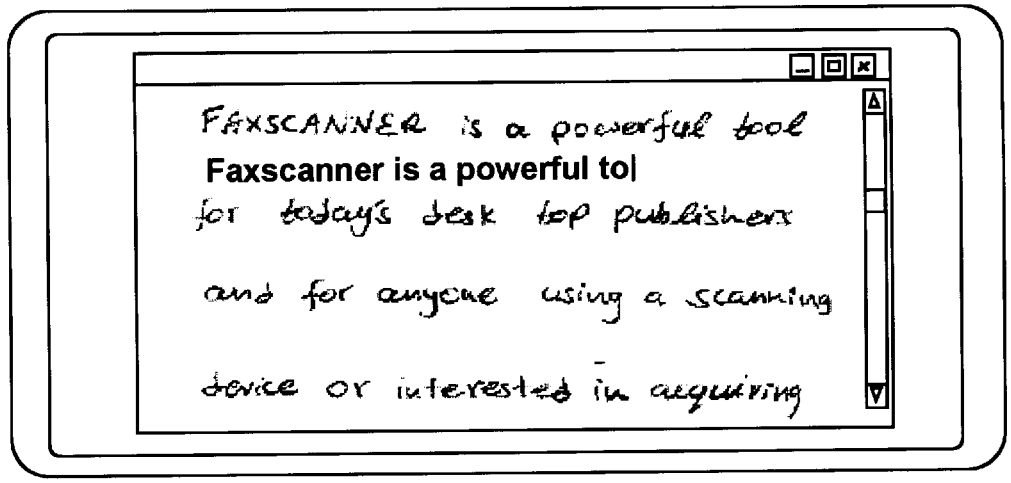
FIG. 23A is an example of a screen display generated by an information sequence synchronization and display system constructed and operative in accordance with a preferred embodiment of the present invention which system is operating in Between Line sub-mode and is operative to display a portion of a source document and, between the lines thereof, portions of a user-generated document.
Figure 23B:
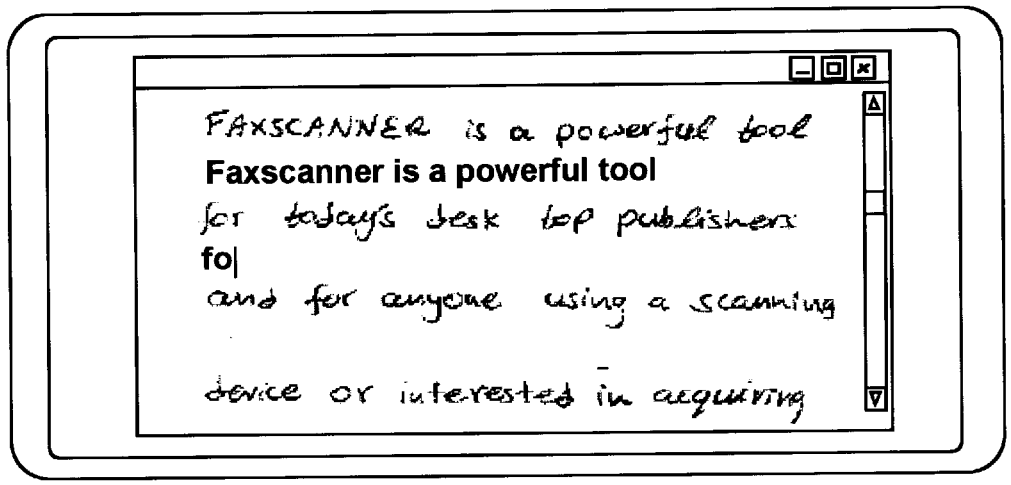
FIG. 23B is an example of a first subsequent screen display generated by the system of FIG. 23A after the user has finished processing one row of the document to be processed and has begun inputting the next row of the document to be processed which row is displayed below the processed previous row.
Figure 23C:
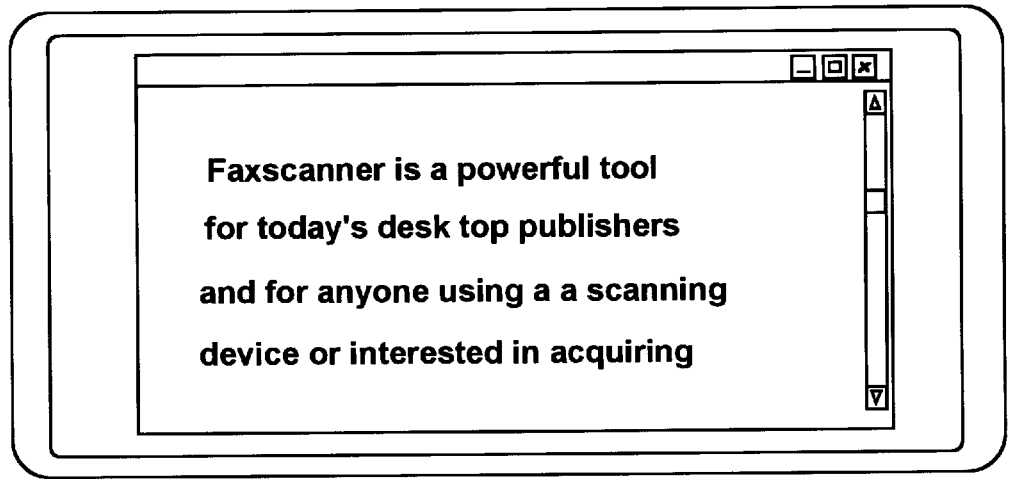
FIG. 23C is an example of a second subsequent screen display generated by the system of FIG. 23A after the user has finished processing the document to be processed, wherein the document which has been generated has been separated from the document to be processed.

If the user-generated document is generated inside the source document, as in the Between-Lines embodiment of FIGS. 23A–23C, then the user-generated document elements within the source document are now separated out from the source document, or vice versa, and the user-generated document elements are collected to form the user-generated document.

Figure 2:
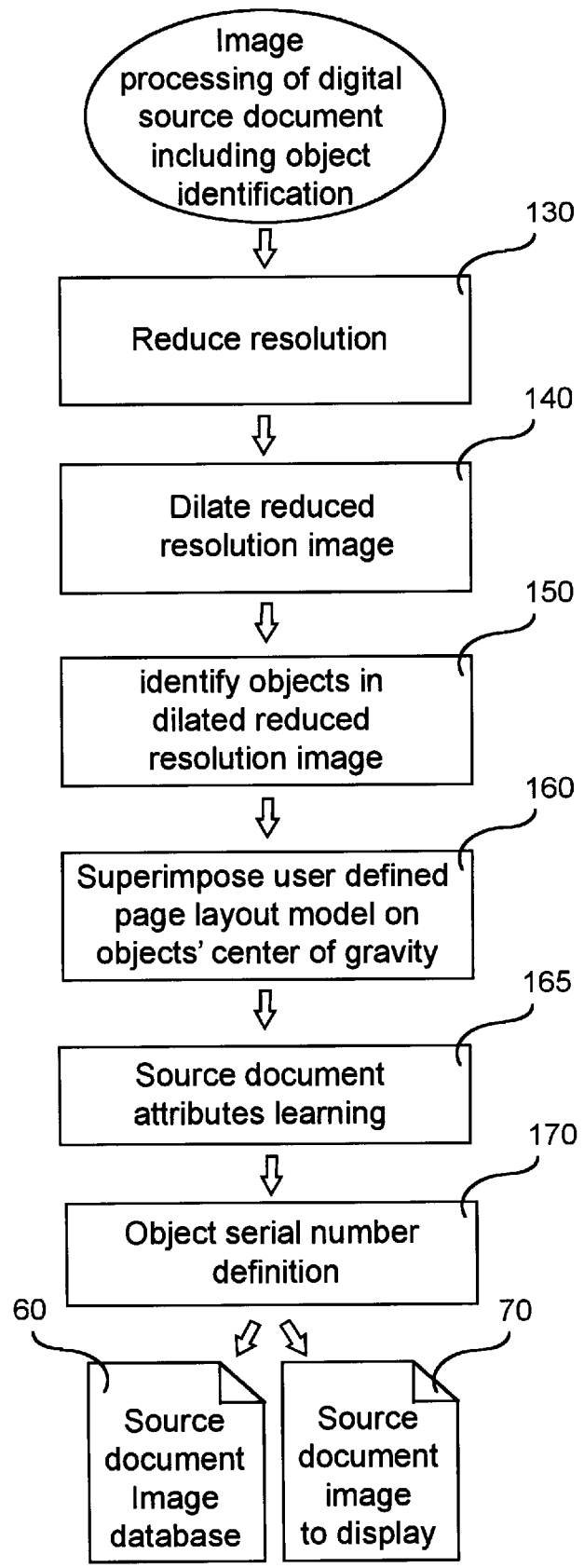
FIG. 2 is a simplified flowchart illustration of a preferred method of operation, including object identification, for the source document image processing unit of FIG. 1C.

FIG. 2 is a simplified flowchart illustration of a preferred method of operation for the source document image processing unit 50 of FIG. 1C. As described above, source document image processing unit 50 is operative to analyze the source document 30 and map relevant attributes therein e.g. by identifying objects therein, such as words, lines, columns, cells and/or paragraphs. The method of FIG. 2 preferably includes the following steps:

STEP 130—The resolution of the source document 30 is reduced, as described in detail below with reference to FIG. 3, to partially or completely eliminate small source document image elements which are irrelevant to identification of words as objects, such as inkspots.

STEP 140—A dilation process is performed on the source document 30 in order to cancel out letter-sized spaces. A preferred dilation process is described in detail below with reference to FIG. 4.

STEP 150—Objects are identified by identifying related pixels and grouping them into an object. A preferred method for grouping pixels into objects is described in detail below with reference to FIG. 5.

STEP 160—The user is typically prompted to define a page layout model such as "lines at an angle of 3°" or "5 columns" or "spreadsheet with 5×3 cells and header" etc. Preferably, a menu of page layouts is displayed to the user and the user is prompted to select one page layout from the menu and, optionally, to designate values for at least some parameters of the selected page layout such as number of columns. Alternatively or in addition, the system may be operative to determine at least some parameters of a user-selected page layout, such as the angular orientation of lines, automatically by conventional image processing methods. Alternatively, the system determines the page layout automatically by conventional image processing methods rather than prompting the user to define or select a page layout.

The user defined page layout is superimposed onto the objects identified in step 150, as described below with reference to FIG. 6, for an example of a parallel-lines layout where the angular orientation or skew of the parallel lines is unknown.

STEP 165—Attributes of the source document are typically learned as described below in detail with reference to FIG. 6B. These attributes are preferably used to determine the parameters of the neighbor relation function.

STEP 170—Depending on the page layout, the order of the objects identified in step 150 is determined. For example, for a column page layout where each column is one word wide, the first word is typically located in the upper left corner and the second word is typically located below the first word. For a row page layout, the first word is typically located in the upper left corner and the second word is typically located right of the first word.

The output of the method of FIG. 2 is a graphic display image of the source document 70 and a database storing all information derived in the course of performing the method of FIG. 2.

Figure 3:
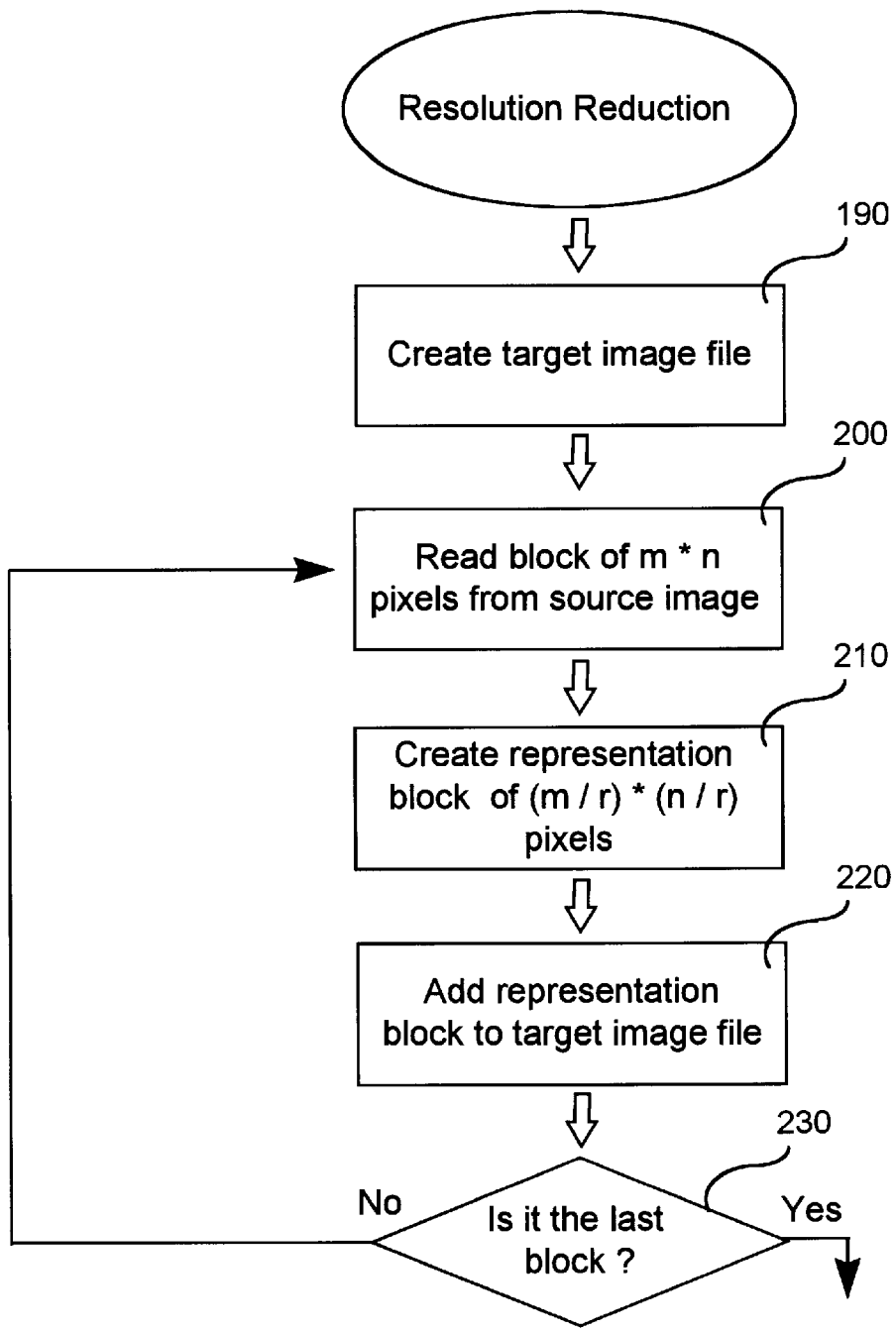
FIG. 3 is a simplified flowchart illustration of a preferred method for performing the resolution reduction step of FIG. 2.

FIG. 3 is a simplified flowchart illustration of a preferred method for performing the resolution decreasing step of FIG. 2. The method of FIG. 3 is operative to create a low resolution target image, e.g. of a handwritten document, from a high resolution source image of the hand-written document. r is the ratio between the high and low resolutions. m and n may be any suitable integer. For example, m and n may both be 4 and r may also be 4. In this case, each 4×4 pixel square in the source image is represented by a single pixel in the target image.

Figure 4:
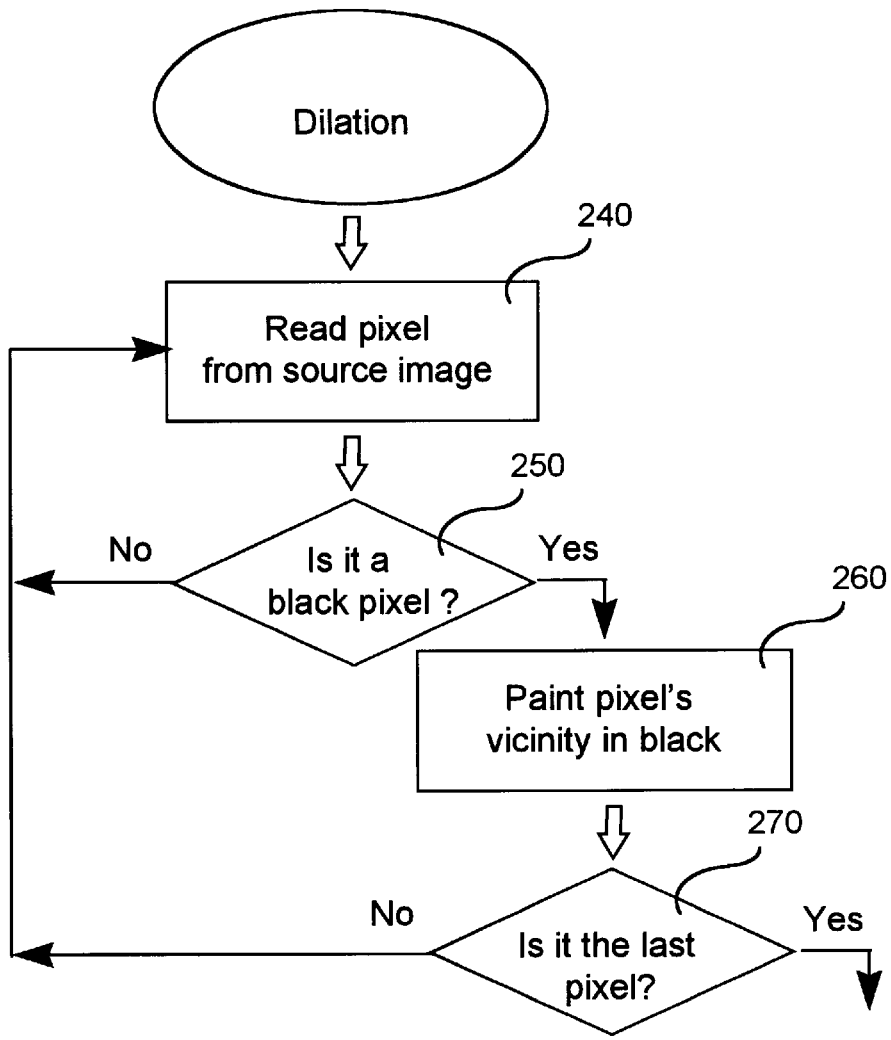
FIG. 4 is a simplified flowchart illustration of a preferred method for performing the dilation step of FIG. 2.

FIG. 4 is a simplified self-explanatory flowchart illustration of a preferred method for performing the dilation step of FIG. 2. Dilation is preferably performed to partially or completely eliminate spaces which are irrelevant to the objects which are to be defined. For example, if the objects to be defined are words, dilation is preferably performed to eliminate spaces between letters.

Figure 5:
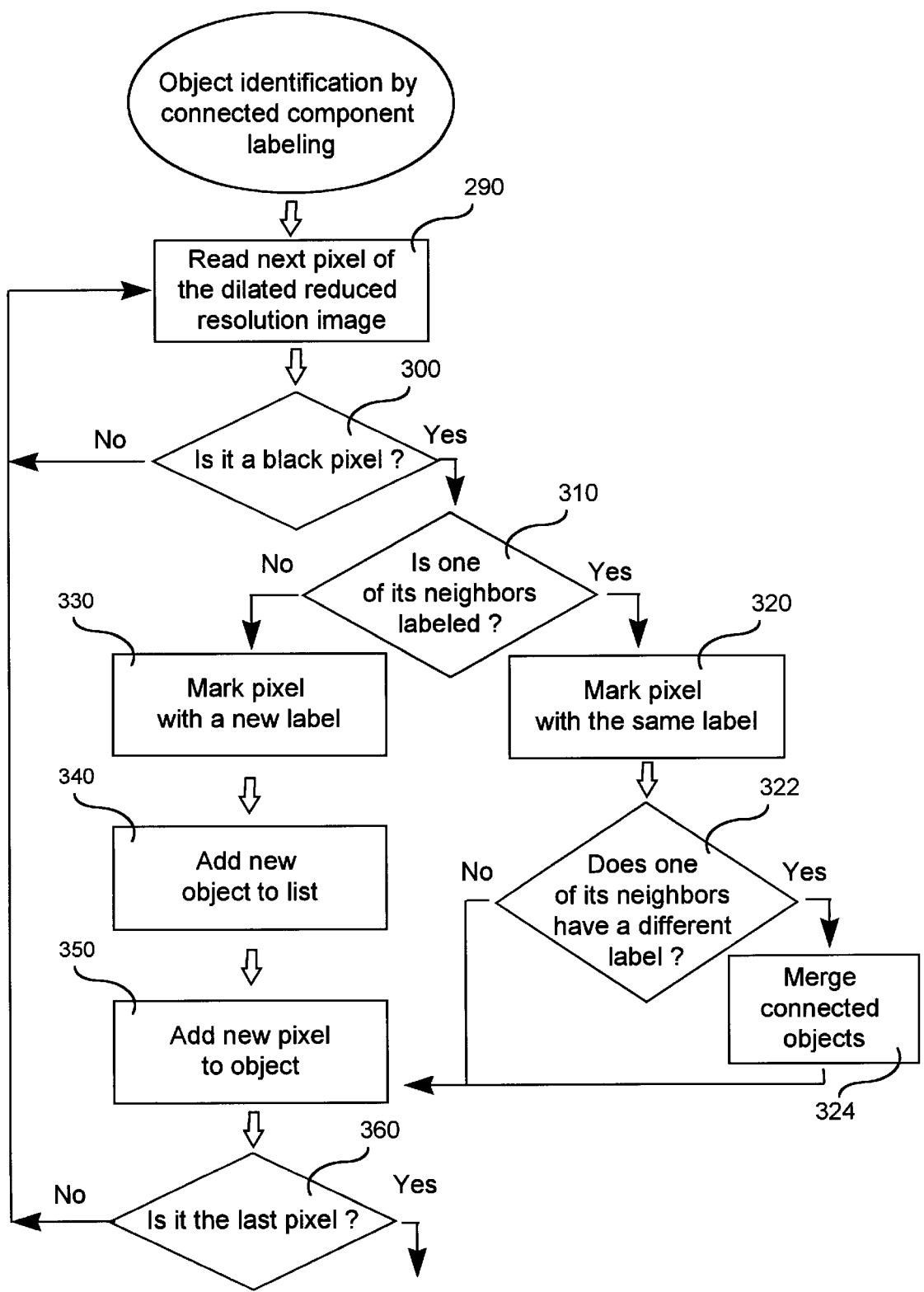
FIG. 5 is a simplified flowchart illustration of a preferred method for performing the object identification step of FIG. 2.

FIG. 5 is a simplified flowchart illustration of a preferred method for performing the object identification step of FIG. 2 which is based on conventional connected component labeling methods. It is appreciated that other types of object identification techniques may alternatively be employed. The method of FIG. 5 is operative to generate, for each non-background pixel (also termed herein "black pixels" for simplicity) in the dilated reduced resolution image, e.g. of a handwritten sample, a label indicating the object (e.g. word), to which that pixel belongs. In step 330, a new label is assigned to black pixels who have no labeled black neighbors. However, the new label is in fact provisional because sometimes, with time, the new label is deemed equivalent to an old label, i.e. black pixels previously considered to belong to a new object are found to belong to an older object. The process by which pixels having a new label are reassigned to another, typically older label is termed merging and is performed in step 324.

For example, if an object shaped like a bull's head with two horns is scanned from top to bottom, the bull's two horns would typically be initially assigned two different labels, however, when the connecting portion of the bull's head is encountered by the reading process, the two horns will typically be deemed connected and will be merged into a single object.

Typically, the reading step 290 proceeds from left to right along each row of pixels and then proceeds to the next row of pixels, from top to bottom of the image.

Figure 6A:
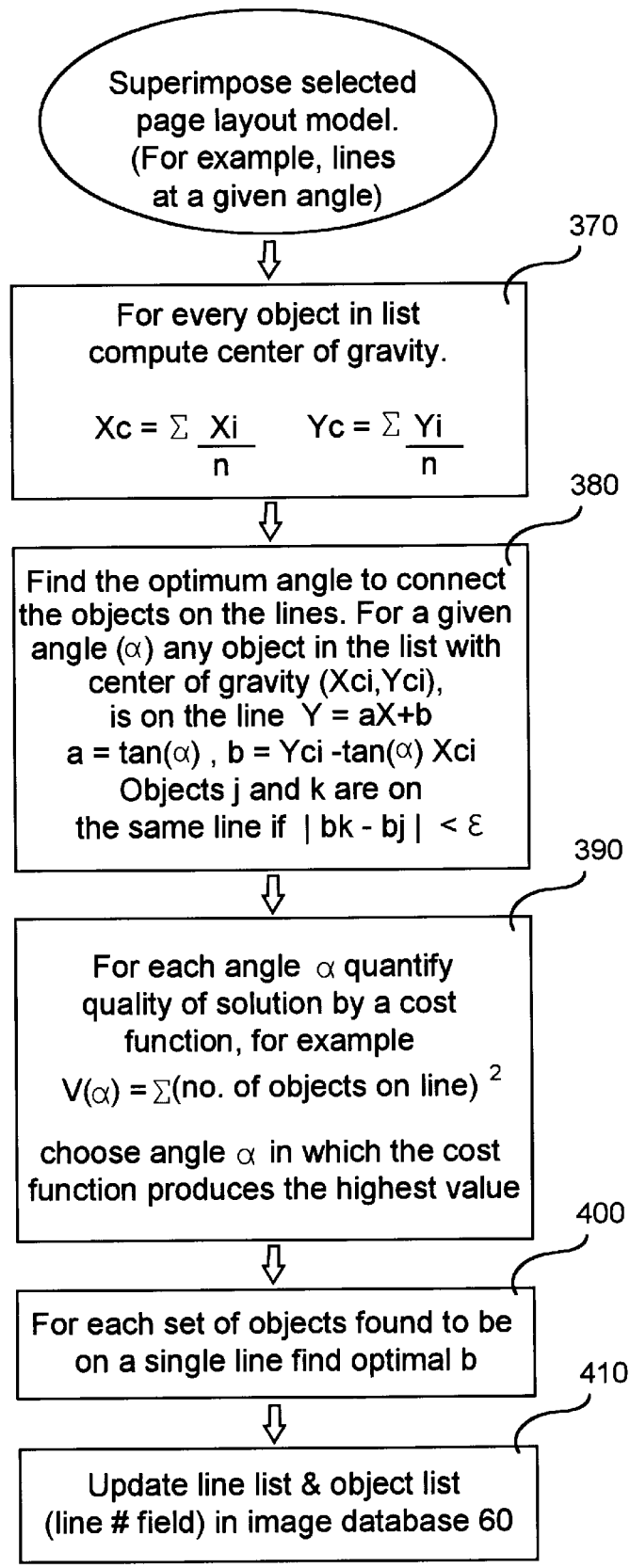
FIG. 6A is a simplified flowchart illustration of a preferred method for performing the page layout model superimposition step of FIG. 2.

FIG. 6A is a simplified flowchart illustration of an example of a method for performing the page layout model superimposition step 160 of FIG. 2 for a page layout model which comprises parallel lines oriented at an unknown angle. The method of FIG. 6A receives as input the object list generated by the method of FIG. 5. The method of FIG. 6A "tries out" a plurality of candidate angles separated from one another by a suitable interval within a reasonable range of angles at which the lines might be oriented. For example, the plurality of candidate angles may comprise the following: −5 degrees, 4 degrees, . . . , 4 degrees, 5 degrees.

For each candidate angle, an equation of a line is computed from each object's center of gravity wherein the line is such that:

a. its angle relative to the horizontal is the candidate angle and b. it intersects the individual object's center of gravity.

The resulting set of lines is reduced in size by uniting lines which are close together relative to a suitable closeness threshold such as +/−2 pixels.

Each candidate angle α, which now has a reduced set of lines, is evaluated using a suitable cost function. For example, the cost function may be the sum of squares of the number of centers of gravity which intersect (within a tolerance of ε) a particular line. This favors solutions whose lines generally pass through a large number of objects.

Once an angle α is selected, then for each set of objects found to belong to a single line within a tolerance of α, an optimal b is found which may for example be the average of the b values of each of the lines whose slope is tan __ and which intersect one of the objects in the set. Alternatively, once an angle is selected, then for each set of objects previously found to belong to a single line within a tolerance of ε, a best-fit line may be found without imposing the constraint that the angular orientation or skew of the line must be ε. In this case, each record in the line list of FIG. 18 typically includes a "skew" field since the skews of the various lines are no longer constrained to be equal.

The skews α and y-axis intersection coordinates b of the lines identified by the method of FIG. 6A are stored in the database 60, as shown in FIG. 18.

Figure 6B:
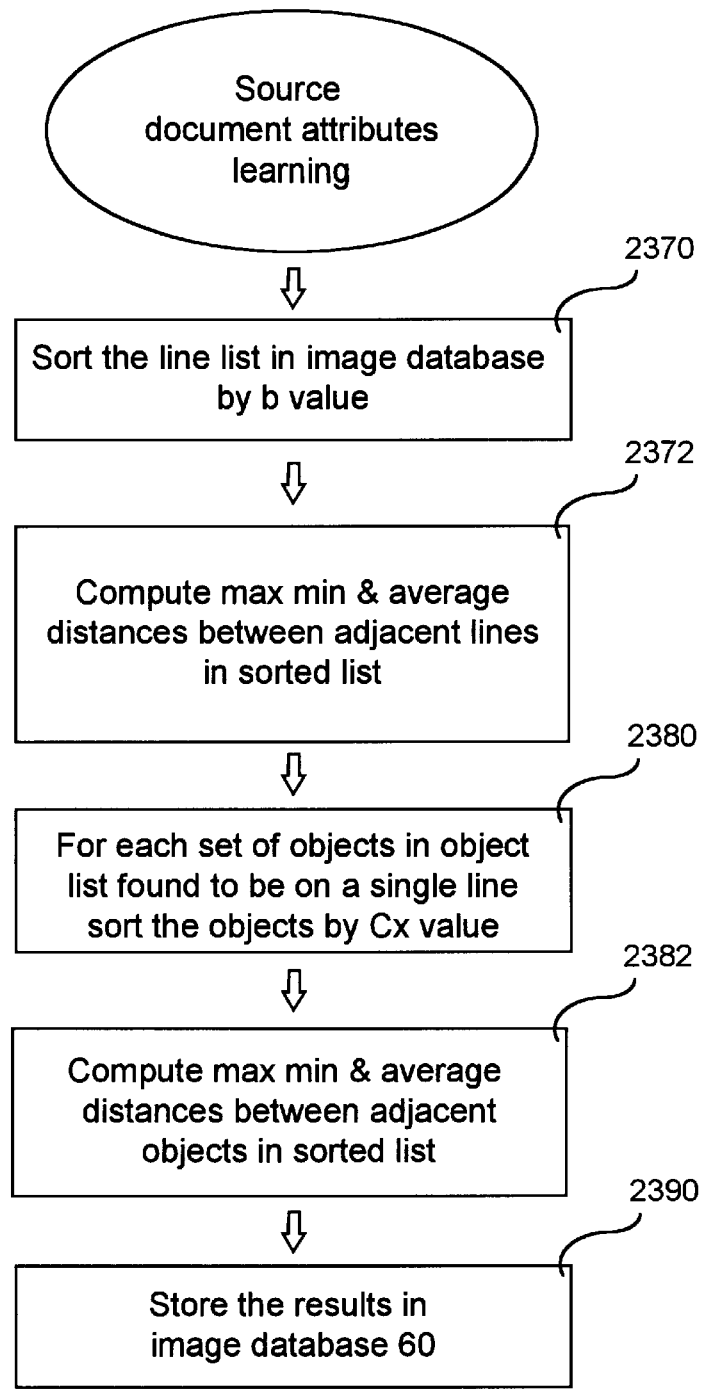
FIG. 6B is a simplified flowchart illustration of the source document attribute learning step of FIG. 2.

FIG. 6B is a simplified flowchart illustration of a preferred method for performing the source document attribute learning step 165 of FIG. 2. Preferably, the lines in the line list of FIG. 18 are sorted by b values (step 2370). The distances between adjacent lines in the sorted list are computed and the average, maximum and minimum of these distances are computed (step 2372). Also, preferably, within each same-line object set in the object list of FIG. 18, the objects are sorted by the x coordinates of their centers of gravity, termed herein "$C_x$" (step 2380). For each such sorted object list, the distances between adjacent objects are computed (step 2382) and the average, maximum and minimum of these distances are computed.

Figure 7:
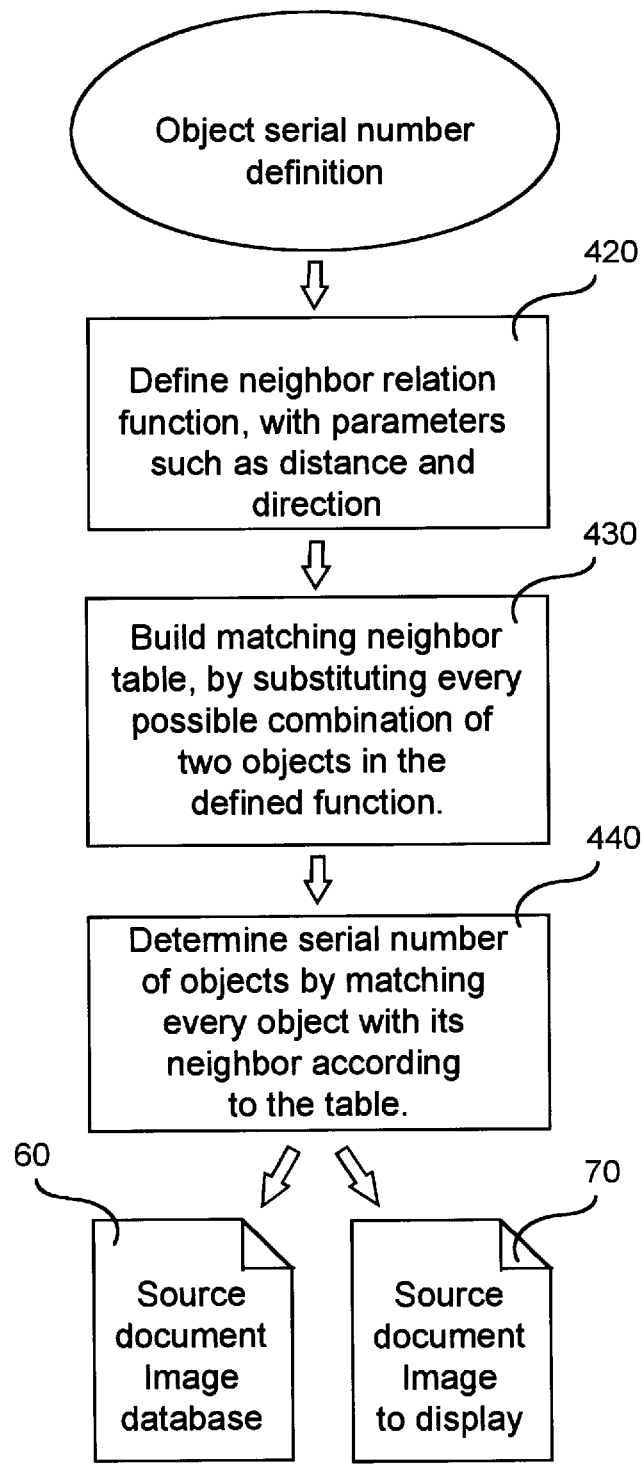
FIG. 7 is a simplified flowchart illustration of a preferred method for performing the object serial number definition step of FIG. 2.

FIG. 7 is a simplified flowchart illustration of a preferred method for performing the serial number definition step of FIG. 2. First, a neighbor relation function is defined between each pair of objects which defines the degree to which the two objects in the pair are suited to be neighbors. The neighbor relation function typically depends on considerations such as:

a. the distance between the objects (step 420)

b. the angular orientation of the line connecting the centers of gravity of the two objects, relative to the angular orientation defined by the page layout model (step 420)

c. Giving priority to pairing an object which is close to the end of a particular page layout element (such as the third line) and an object which is close to the beginning of the following page layout element (the fourth line) (step 430).

The parameters of the function typically are determined based on attributes of the source document as learned in step 165 of FIG. 2.

An example of a neighbor relation function F to be applied to first and second objects whose centers of gravity are (x1,y1) and (x2,y2) respectively is the following:

$$F[(x1,y1),(x2,y2)] = (y2-y1)^2 + (x2-x1)^2$$

is $$|y2-y1-\tan(\alpha)(x1-x2)| < \epsilon = A + B(y2-y1)^2 - (x2-x1)^2$$

is $$y2-y1-\tan(\alpha)(x1-x2) > \epsilon = \text{infinity}$$

if $$y2-y1-\tan(\alpha)(x1-x2) < -\epsilon$$

In this example, ε is a line tolerance parameter as used above with reference to FIGS. 6A–6B. The function definition includes three cases of which the first relates to two objects within the same line, in which case priority is given to objects which are close together. The second case relates to two objects which are not in the same line in which case priority is given to objects whose y-coordinates are close, (i.e. objects in adjacent lines) and whose x-coordinates are disparate so as to pair the last object in a given line with the first object in the next line. The third case "outlaws" a neighbor relationship between a second object which belongs to a line which is above the line to which the first object belongs. This ensures that the second object's line is the same as or below the first object's line.

Based on the neighbor relation function, the objects are arranged in a sequence such that neighboring pairs of objects in the sequence have a relatively high neighbor relation function. Typically, the sequence is selected so as to minimize the sum of neighbor relation functions of all pairs in the sequence.

At this point, source document image processing has been completed, and as a result, source document image database 60 and source document image to display 70 have been formed.

Figure 8:
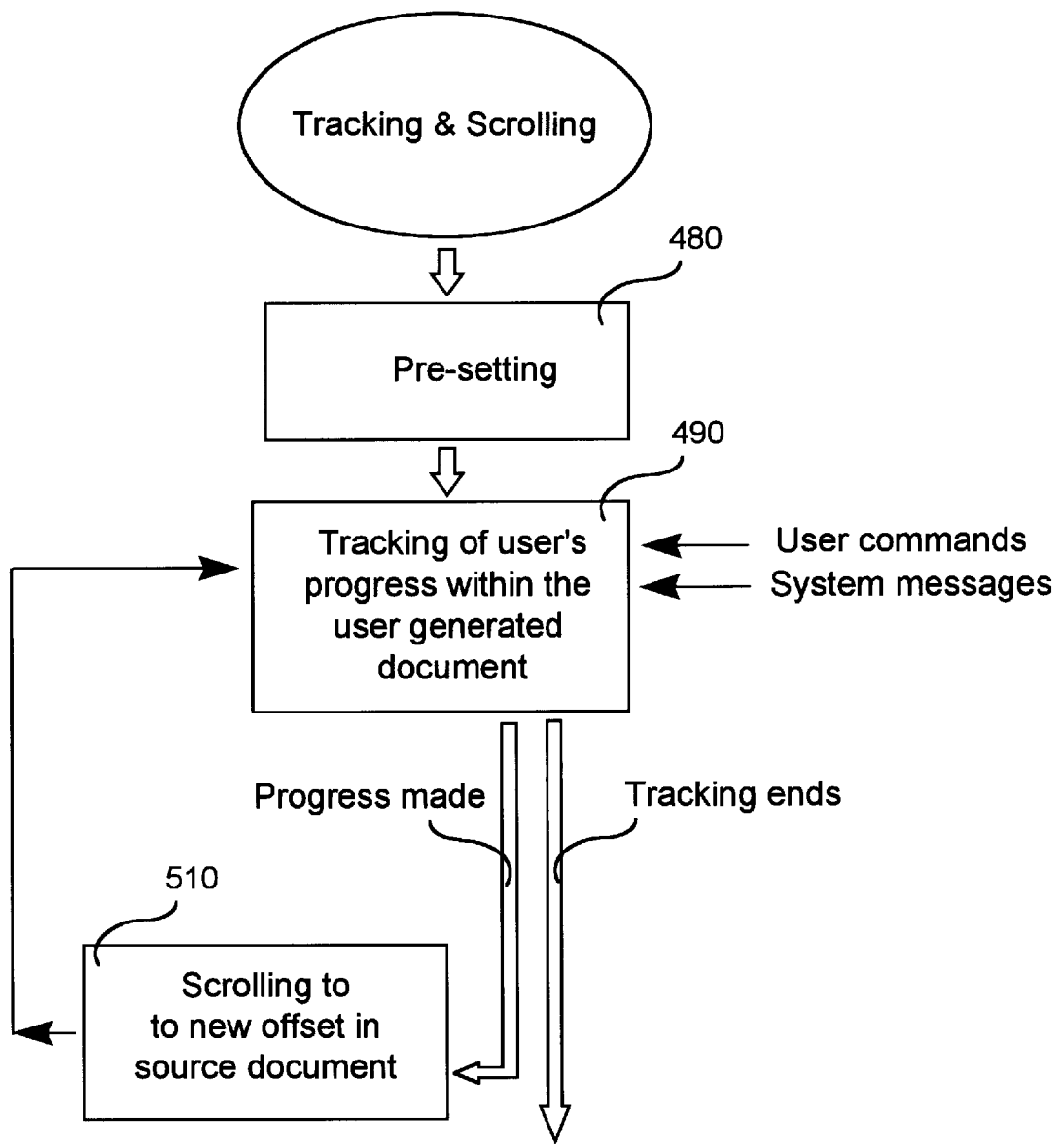
FIG. 8 is a simplified flowchart illustration of a preferred method of operation for the tracking/scrolling unit of FIG. 1C.

FIG. 8 is a simplified flowchart illustration of a preferred method of operation for the tracking/scrolling unit of FIG. 1C. In step 480, a pre-setting process is performed, once per document processing session, as described in detail below with reference to FIG. 9. In step 490, the user's progress within the user generated document is monitored in order to determine when the user has advanced to a new object, such as a new line or new word. More generally, the user's progress is monitored to determine when the user's location within the user generated document changes. In step 510, the source document is scrolled to the object in the source document which corresponds to the new object now being processed in the user-generated document.

Figure 9:
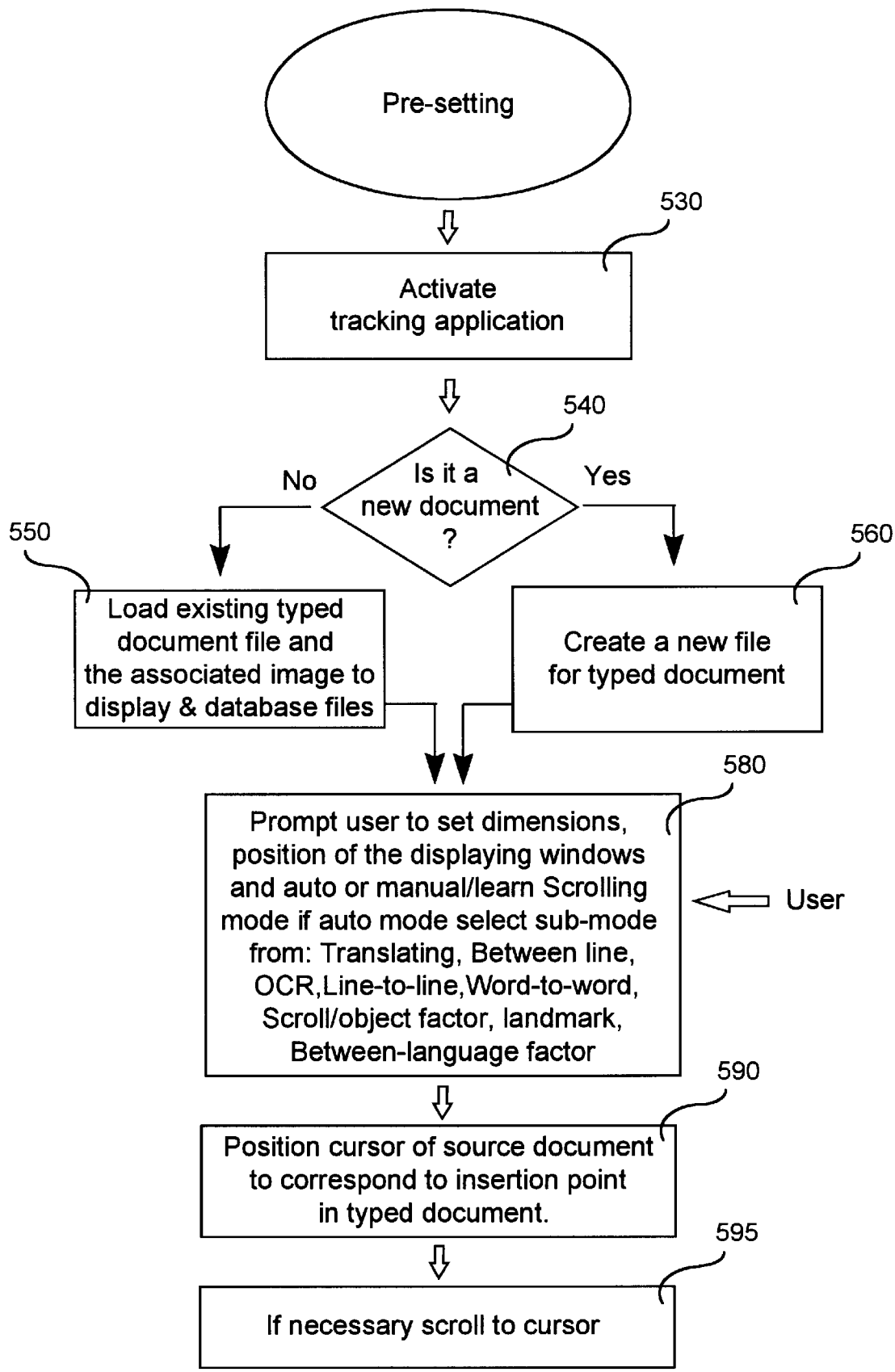
FIG. 9 is a simplified flowchart illustration of a preferred method for performing the pre-setting step of FIG. 8.

FIG. 9 is a simplified flowchart illustration of a preferred method for performing the pre-setting step of FIG. 8. In the pre-setting step, the system is set up for the tracking process.

Preferably, the pre-setting process gives the user the option of determining the sizes and locations of the displaying windows (step 580). Typically, at least two displaying windows are used, one for the source document and one for the user-generated document.

Preferably, (step 580) the user is able to define the working mode of the displaying windows, for example:

a. Manual/learning mode: The system scrolls the source document in accordance with user commands. Preferably, (FIG. 11A, step 735) the system monitors the user's manual scrolling activities in order to allow the user to move into at least one of the scroll/object factor synchronization sub-mode or landmark sub-mode, both of which are described in detail below.

It is appreciated that "manual" includes any user-initiated scrolling command which may be either hand-operated or otherwise operated, such as by voice or by means of a part of the body other than the hand.

b. Auto mode: The system scrolls the source document using results of tracking. If the auto-scrolling mode is selected, the user is preferably prompted to select a synchronization sub-mode from among a plurality of sub-modes operative to synchronize the user-generated document and the source document. Eight such sub-modes are now described:

Generally speaking, at least three types of sub-modes may be provided, including object-based sub-modes, factor-based sub-modes and a landmark sub-mode which typically falls between the above two types of sub-modes.

The object-based synchronization sub-modes, including the between line sub-mode, line to line sub-mode, word to word sub-mode, translating sub-mode and OCR sub-mode, are sub-modes in which synchronization between the source and user-generated documents is provided by finding in the source document an object which matches the current object in the user-generated document, either by identifying and counting, or by some level of recognition.

The factor-based synchronization sub-modes, including the between-language factor sub-mode and the scroll/object factor sub-mode, are sub-modes in which synchronization between the source and user-generated documents is provided without matching any specific object in the source document to a current object in the user-generated document. Instead, a stochastic factor is obtained or learned and used to quantify the approximate relationship between the user's expected progress in the two documents.

Factor-based synchronization sub-modes can be based on relationships between the offsets or sizes of the document portions which have been processed or on relationships between the number of objects which have been processed. The second option requires image processing in order to identify objects in the source document. In other words, image processing is optional, albeit typically advantageous, if a factor-based synchronization sub-mode is employed.

Figure 11A:
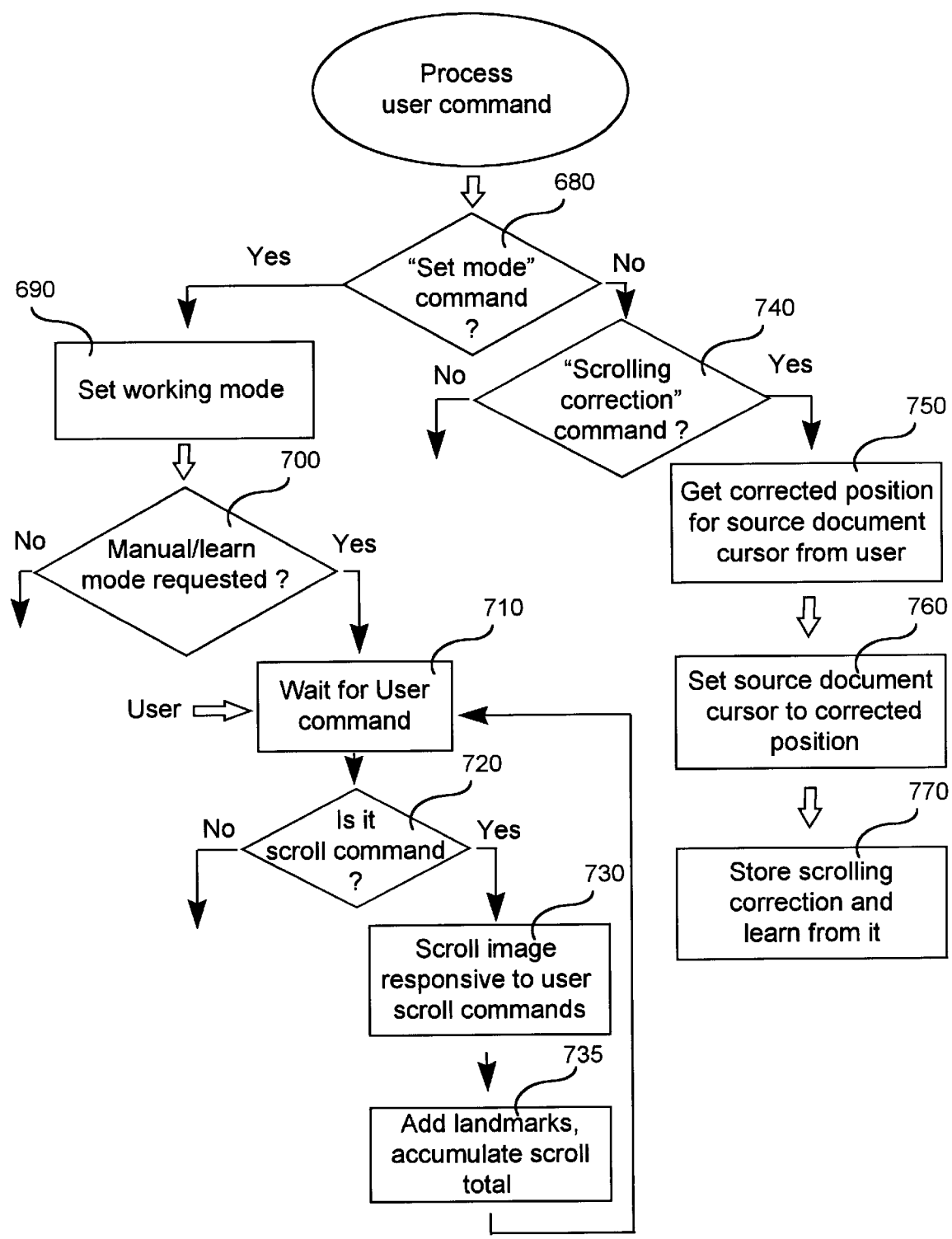
FIG. 11A is a simplified flowchart illustration of a preferred method for implementing the user command processing step of FIG. 10A.
Figure 11B:
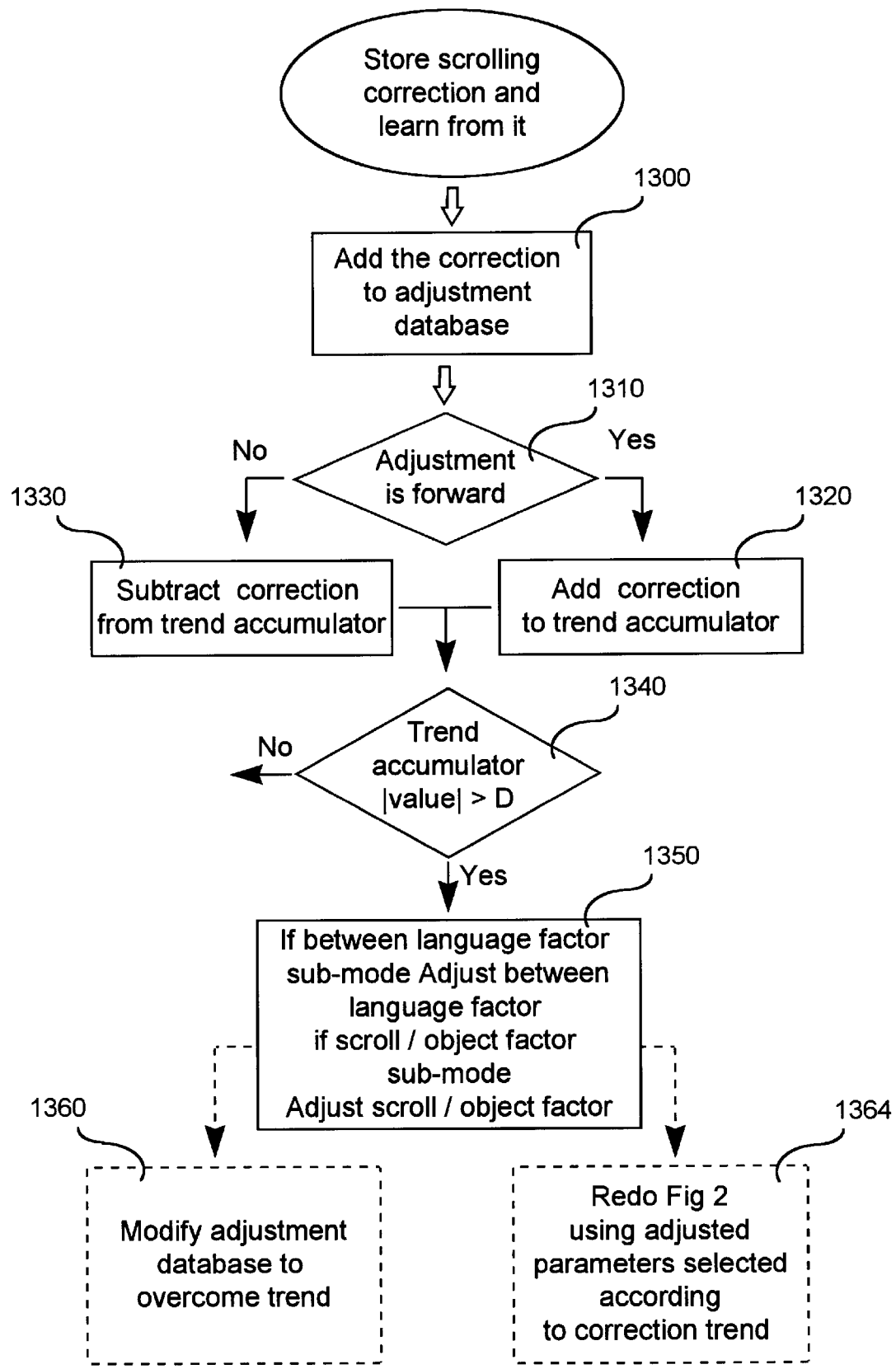
FIG. 11B is a simplified flowchart illustration of a preferred method for performing the "store and learn from scrolling correction" of FIG. 11A.

Preferably, the stochastic factor/s are adjusted if the user enters a correction of the present scrolling position (FIG. 11B, step 1350).

Several object-based sub-modes are now described:

Between line sub-mode (FIG. 23A–23C): In this sub-mode, lines in the source document are identified as objects. The user-generated document is superimposed on top of the source document, preferably such that the current insertion point in the user-generated document is always located between the source document line corresponding to the current insertion point and an adjacent line such as the following line.

Line to line sub-mode: In this sub-mode, synchronization between the source and user-generated documents is determined on a line-to-line basis. Lines are identified as objects in the source document and matched to lines in the user generated document. For example, the current line in the user generated document may be tracked by monitoring for end-of-line events, either system generated or events initiated by the user, e.g. by means of the ENTER key.

Word-to-word sub-mode: The source document objects here are words. Synchronization is performed by determining the serial number of the current word-object in the user-generated document and counting out the matching word, i.e. the word having the same serial number, in the source document.

It is appreciated that synchronization may be provided on any suitable basis, not limited to word-to-word and line-to-line and may for example include character-to-character, spreadsheet cell-to-spreadsheet cell, etc.

Translating sub-mode: If the source document is in one language and the user generated document is in another language, a translating software package, such as Word Magic's text translation package, marketed by Word Magic, may be employed to automatically translate the words of the user generated document back into the language of the source document. The number of words in the automatically generated source document language version is counted and may, for example, be found to be 215 words although only 177 words appear in the user generated document. The scroller would then scroll to the vicinity of the 216th word in the source document and the cursor of the source document would point to the 216th word.

OCR sub-mode: Synchronization is based entirely or partially on OCR. In this sub-mode, currently keyed in inputs from which the user-generated document is formed are compared to the contents of the source document as deciphered by a conventional OCR process. Since the same word or phrase may appear more than once in the source document, the position of a particular word in each of the documents is used as an additional synchronization "clue".

Either content or position may be used as the principal basis for synchronization, and position or content, respectively, are then typically used to augment the synchronization process, e.g. by means of a voting process, where necessary.

Two factor sub-modes are now described:

Scroll/object factor sub-mode: If the user chooses to scroll manually, at least at first, the system enters manual/learning mode in which the system is preferably operative to prepare for scroll/object factor sub-mode by comparing the user's scrolling operations to his document generating operations in order to learn a suitable scaling factor, also termed herein the "scroll/object" factor. For example, if the user is found to scroll forward, on average, one line each time s/he types 30 characters then if the user switches to auto-scrolling mode and selects subject/object sub-mode, the system may scroll one line forward each time 30 characters are typed into the user-generated document.

The preparation for this sub-mode, which occurs during prior operation of the system in manual/learning mode, typically includes accumulation of the algebraic sum of all offsets performed as a result of user-initiated scrolling operations. The system also accumulates the number of words or lines which the user generated document currently includes. The scroll/object factor is the ratio between the above two quantities.

In this sub-mode, the object identification process of FIG. 2 may be omitted. In some applications, however, object identification is performed e.g. in order to respond to a manual scrolling command by progressing to the next line in the source document rather than to the next pixel row of the display screen.

Between-language factor sub-mode: (FIGS. 22A–22B) The object which the system identifies in this sub-mode is a word.

If the source document is in a first language and the user-generated document is in a second language, a conversion parameter typically predefined for each pair of languages, may be used which indicates the ratio between the number of words in a typical text in the first language, and the number of words in the same typical text in the second language.

Synchronization between the source and user generated documents is provided by computing the serial number of the current word-object in the user generated document, computing the product of the serial number and the between-language conversion factor, placing the cursor of the source document at the source document word-object whose serial number equals the above product, and scrolling the source document to the vicinity of the cursor.

The landmark sub-mode, typically falls between the above two types of sub-modes. In this sub-mode, the current object is a word.

The system prepares for landmark sub-mode while still in manual/learning mode by associating a scrolling position of the source document with a text within the user generated document which was generated by the user while the source document was in that scrolling position. For example, a user may type 17 lines (or words, or characters) in the user generated document when the source document is in a first scrolling position, then scroll manually in the source document to a second scrolling position, then type an additional 12 lines (or words, or characters) in the user generated document before scrolling the source document manually again to a third scrolling position. In this example, the first 17 lines (or words, or characters) would be associated with the first scrolling position, and the second 12 lines (or words, or characters) would be associated with the second scrolling position. The database which stores these associations is termed herein the "landmark database" (FIG. 24).

In other words, while still in manual/learning mode, the system preferably marks matching pairs of locations within the source document and within the user-generated document with matching "land-marks".

These land-marks serve as anchors during "landmark sub-mode" operation of the system, which is typically useful during proofreading, reviewing or editing of the user-generated document.

In "landmark sub-mode" operation, synchronization between the user-generated and source documents is provided by computing the serial number of the current object (line, word, character, etc.) in the user-generated document, accessing the landmark database (FIG. 24) to look up the corresponding scrolling position in the source document, and scrolling the source document accordingly.

Therefore, the object identification process of FIG. 2 may be omitted. In some applications, however, object identification is performed e.g. in order to respond to a manual scrolling command by progressing to the next line in the source document rather than to the next pixel row of the display screen.

Referring again to FIG. 9, step 540 allows the user to indicate whether he intends to generate a new document (step 560) or to correct, edit or proofread an existing document (step 550).

Figure 10A:
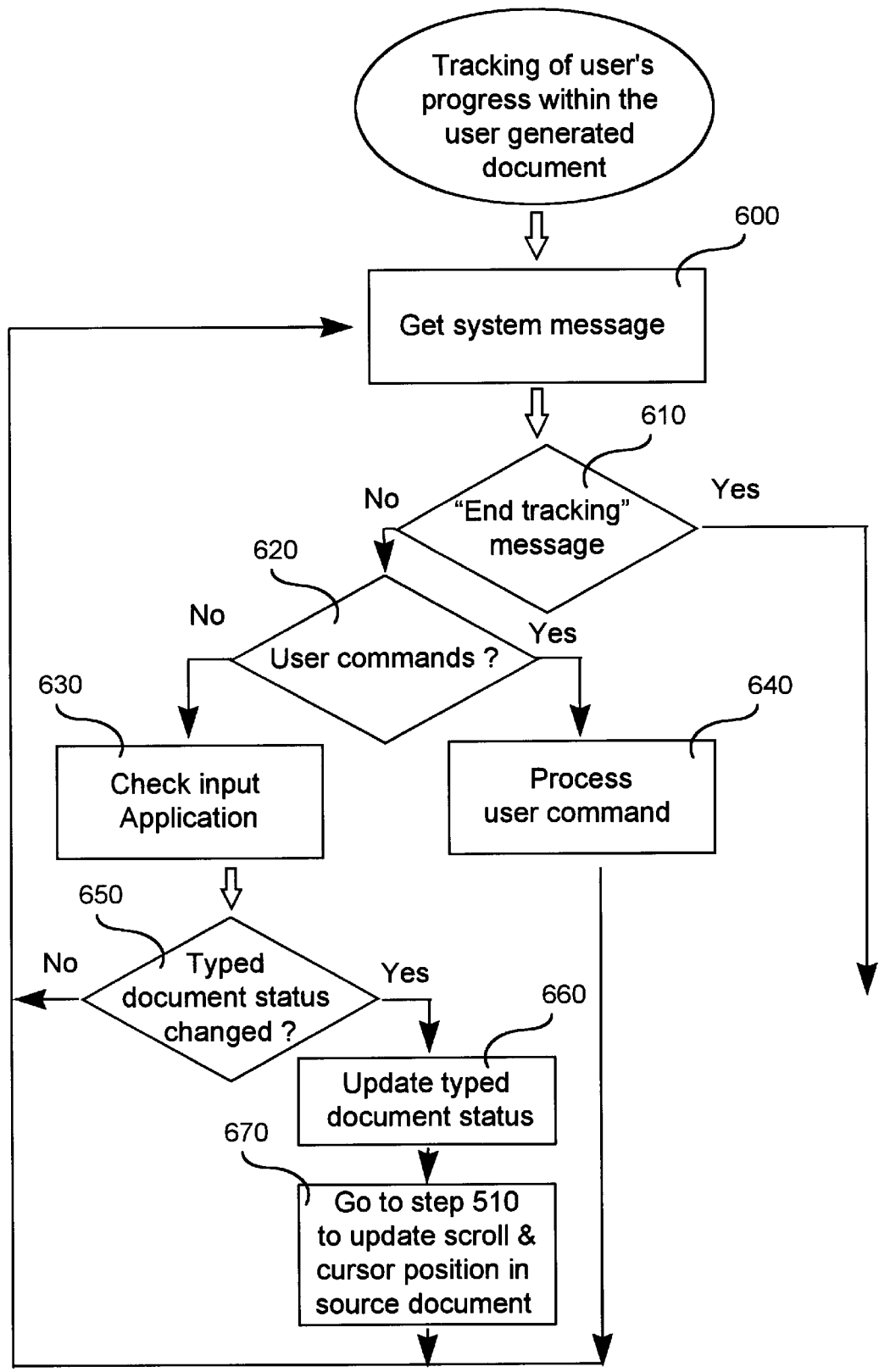
FIG. 10A is a simplified flowchart illustration of a preferred method for performing the tracking step of FIG. 8.

FIG. 10A is a simplified flowchart illustration of a preferred method for performing tracking step 490 of FIG. 8. In step 630, the input application provides, directly or indirectly, information regarding user's progress for tracking purposes. The information regarding the user's progress may be obtained by monitoring the current location of a user within a body of information which the user is processing (step 600), typically relative to a predetermined previous location of the user within the body of information whose corresponding location within a matching body of information is known.

The "end tracking message" (step 610) typically indicates that the user has finished a document generating or editing session or that the user has requested that tracking be terminated.

Figure 10B:
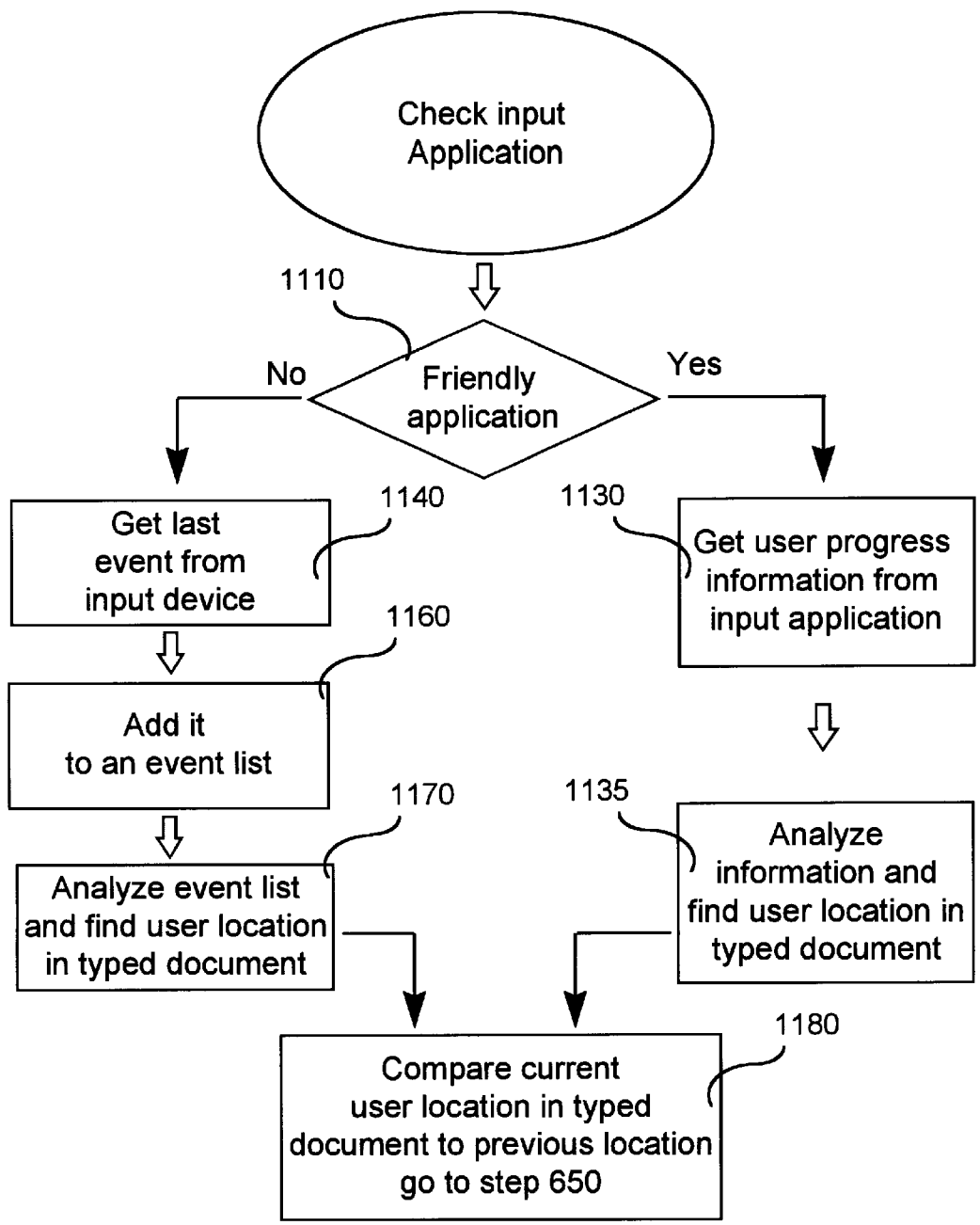
FIG. 10B is a simplified flowchart illustration of a preferred method for performing the input application checking step of FIG. 10A.

As shown in FIG. 10B, any suitable method or combination of methods may be employed to obtain information for tracking including but not limited to obtaining tracking information directly from an application (step 1130). For example, an input application such as MS-Word may be asked how many words have been typed up to and including the current insertion point or cursor position. Alternatively, (step 1140), input device events are examined, e.g. keys may be captured and analyzed for tracking information. For example, entering of a space using the space bar may be regarded as a new-word indication, the "enter" key may be regarded as a new-line indication, etc. Alternatively, system messages may be captured in order to identify events which indicate new words.

FIG. 24 is an illustration of a landmark database useful particularly when the system shown and described herein is operating in Landmark sub-mode.

The software implementation of the present invention described in Appendix A includes a detailed procedure for event list analysis which is operative to identify words as objects and to identify a current object, based on examining and analyzing operation of the keyboard and mouse.

The level of object on which tracking relies may be words, lines, columns, cells, paragraphs or any other suitable page layout elements.

FIG. 11A is a simplified flowchart illustration of a preferred method for implementing the user command processing step 640 of FIG. 10A. A "scrolling correction" command (step 740) refers to a correction of the scrolling position within the source document image 70. If such a command is received, the cursor is repositioned within the source document image 70 and, if tracking is performed on the basis of object counting, the objects within the source document image are renumbered. If tracking is performed on another basis, e.g. relative location of objects, suitable adjustments are made to the known relative locations to reflect the user's corrections.

If the scrolling mode is the manual/learning mode then when a scrolling command is received from the user, the system preferable accumulates the total amount of scrolling ("scroll total") which the user has requested.

Figure 14A:
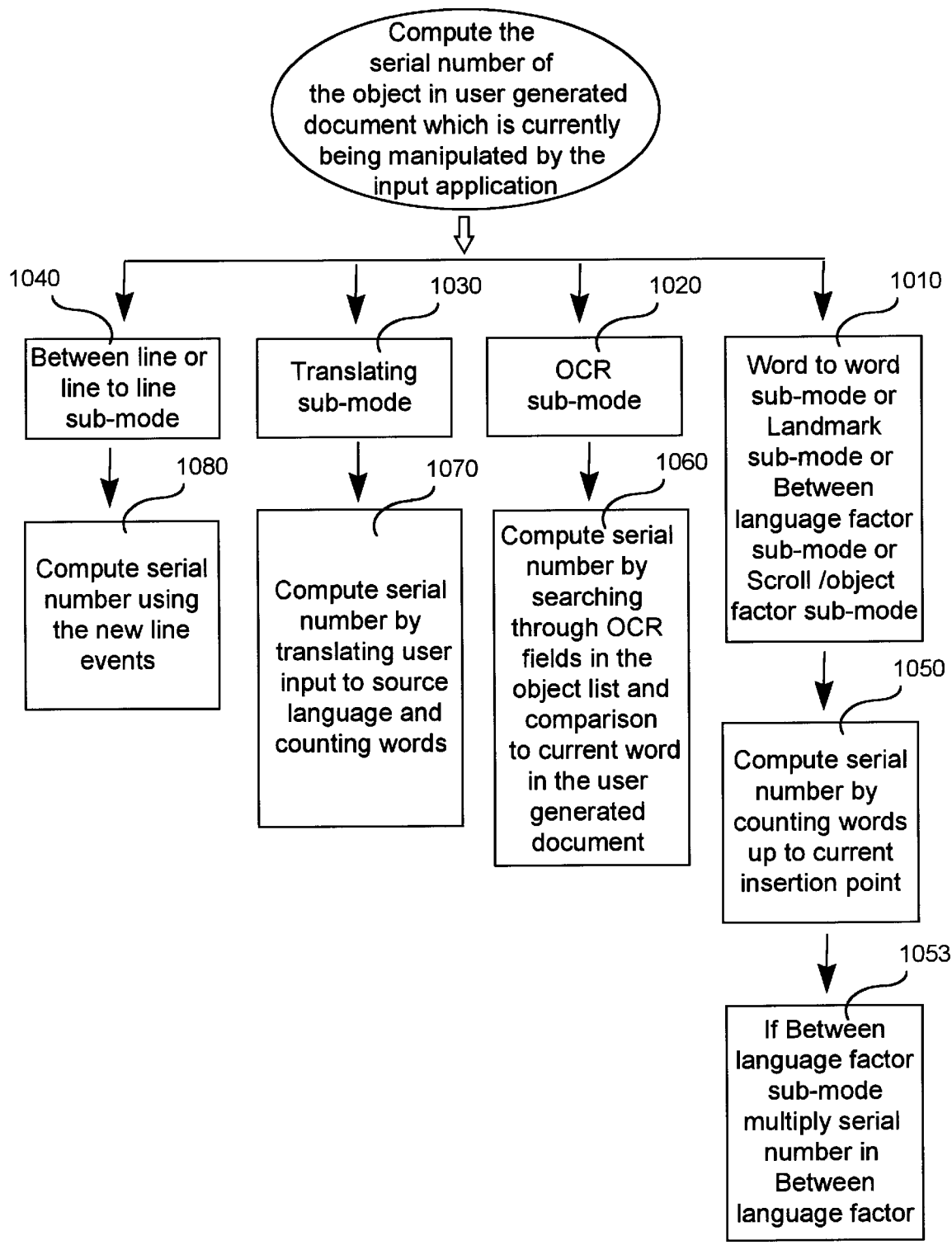
FIG. 14A is a simplified flowchart illustration of a preferred method for computing the serial number of the current object in the user-generated document for each of eight different synchronization sub-modes.
Figure 14B:
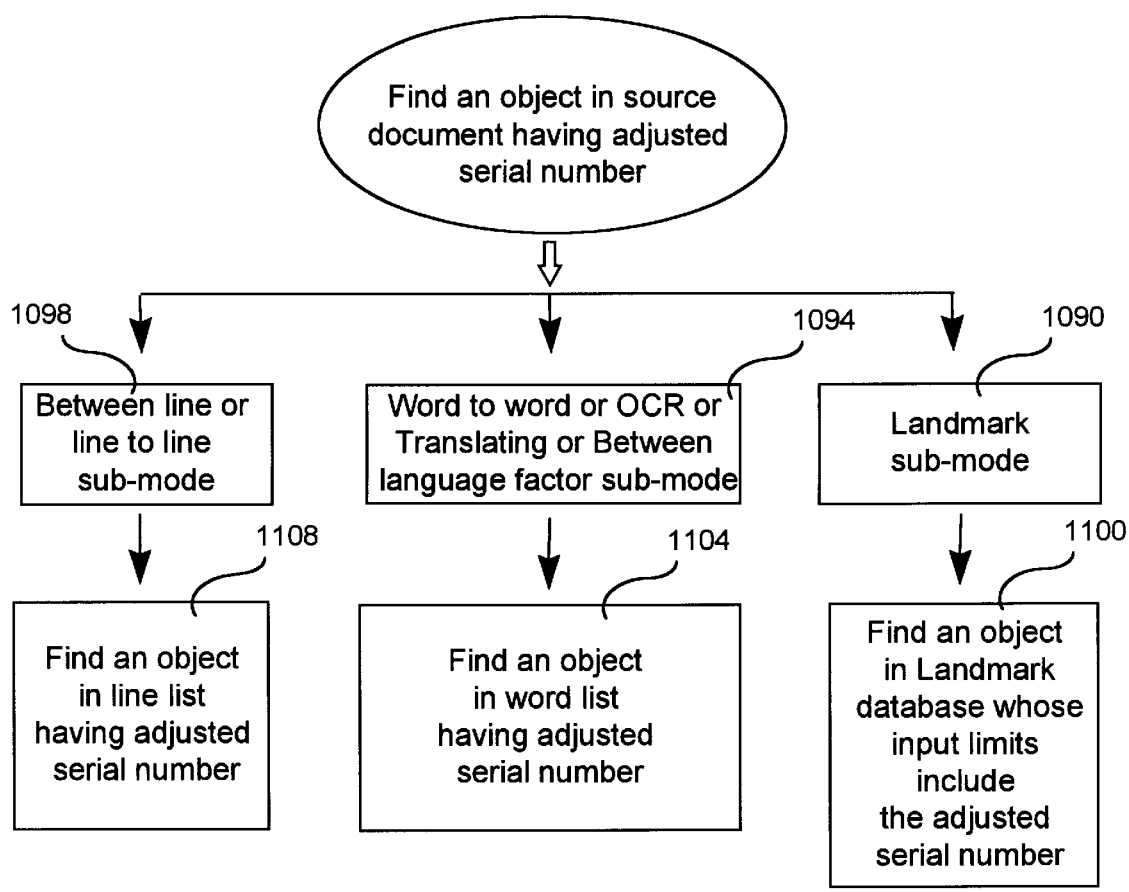
FIG. 14B is a simplified flowchart illustration of a preferred method for performing step 890 in FIG. 13 in which an object in the source document is found which has a particular serial number, i.e. which matches a particular object in the user generated document.

The system also preferably marks pairs of locations within the source document and within the user-generated document with matching "land- marks". These land-marks serve as anchors during proofreading or editing of a user-generated document as shown in FIGS. 14A–B.

Reference is now made to the flowchart of FIG. 11B. Preferably, the tracking process is operative to process corrective scrolling inputs from a user which typically indicate that the source document's cursor should be repositioned because it has fallen behind or crept ahead. Optionally, as shown, the tracking process is operative to learn from these corrective user inputs, typically only if they accumulate into a trend of predetermined size.

For example, a multiplicative correction factor may be computed upon receipt of the first correction which is then updated after each further correction. The correction factor may initially be 1. If, after 100 words have been typed, the user indicates that the cursor has fallen behind by 2 words, the scroller may multiply each computed cursor position by a factor of 1.02. If, after an additional 200 words have been typed, the user indicates that the cursor has fallen behind by an additional 7 words the scroller may update the correction factor from 1.02 to 1.03 and multiply each computed cursor position by a factor of 1.03. This is because a total lag of 9 words accumulated while typing 300 words is equivalent to a 3% lag.

Alternatively, as illustrated in FIG. 11B, learning is not implemented by multiplication but rather by suitably updating the adjustment database of FIGS. 21A–21C. Using the above numerical example, the system may have a trend defining threshold which, for the present example, is taken to be a lag or advance of at least 3 words. If a lag of at least 3 words is detected, the system decrements the entries of the adjustment database, including entries corresponding to future locations in the source document. In the above example, the 101th to 200th entries in the adjustment database's word list (object list) would be assigned a correction value of −1, the next 100 entries, until entry 300, would be assigned a correction value of −2, and so on.

According to another alternative of the present invention, learning is not implemented by correcting the adjustment database but rather by redoing the source document image processing step 50 (FIG. 2) with different parameters, thereby to improve the quality of source document image database 60. For example, if backward adjustments requested by the user accumulate into a trend, this means that the source document image processing of FIG. 2 has generated too few objects. For example, this may have occurred because the dilation procedure of FIG. 2, step 140 was overdone, causing separate objects to become falsely connected and identified, in step 150, as a single object rather than as a plurality of objects. To correct this trend, the size of the pixel vicinity which is painted in step 260 (FIG. 4) is decreased.

Conversely, if forward adjustments requested by the user accumulate into a trend, i.e. if scrolling lagged behind the user's actual progress, this means that the source document image processing of FIG. 2 has generated too many objects. For example, this may have occurred because the dilation procedure of FIG. 2, step 140 was underdone, causing certain objects to become unjustifiably separated and identified, in step 150, as a plurality of objects rather than as a single object. To correct this trend, the size of the pixel vicinity which is painted in step 260 (FIG. 4) is increased.

Figure 12:
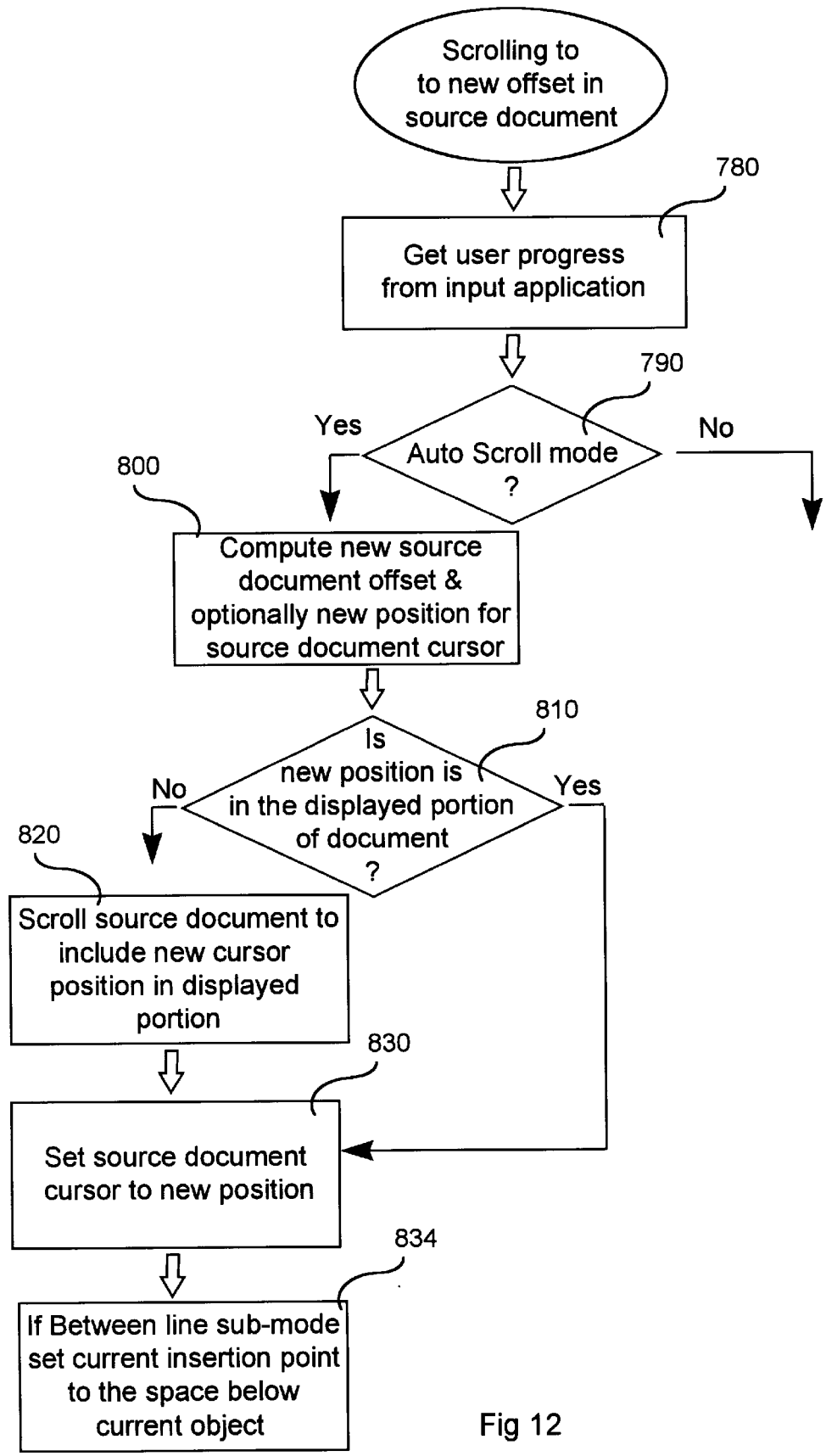
FIG. 12 is a simplified flowchart illustration of a preferred method for performing the scrolling step of FIG. 8.

FIG. 12 is a simplified flowchart illustration of a preferred method for performing the scrolling step 510 of FIG. 8. In step 780, the system receives an input from the input application and/or from the tracking unit which is indicative of a user's progress within the user-generated document. Responsive thereto, the system scrolls the source document such that the source document location corresponding to the user's current location in the user-generated document is displayed to the user.

Step 800, described in detail below with reference to FIG. 13, includes synchronizing the source document to the user-generated document using any suitable method such as one of the 8 methods described below in FIGS. 13–14B in connection with the 8 synchronization sub-modes respectively. It is appreciated that the 8 synchronization methods represented by the sub-modes in the illustrated embodiment are merely exemplary of possible synchronization methods and systems which use only one or some of the 8 methods described herein or which use a different synchronization method, still fall within the scope of the present invention.

Preferably, scrolling of the source document includes:
a. Appropriate positioning of the source document's cursor to correspond to the user's progress in processing the user-generated document (step 800), and
b. Displaying of a portion of the source document which is a vicinity of the source document cursor's position (step 820).

Step 834 is performed if the system's synchronization sub-mode is the Between Line sub-mode. In this sub-mode, as illustrated in FIGS. 23A–23C, lines in the source document are identified as objects. The user-generated document is superimposed on top of the source document, preferably such that the current insertion point in the user-generated document is always located between the source document line corresponding to the current insertion point and an adjacent line such as the following line. Step 834 is the step in which the current insertion point for the user generated document is set in the source document to the between-line space below the current object.

Figure 13:
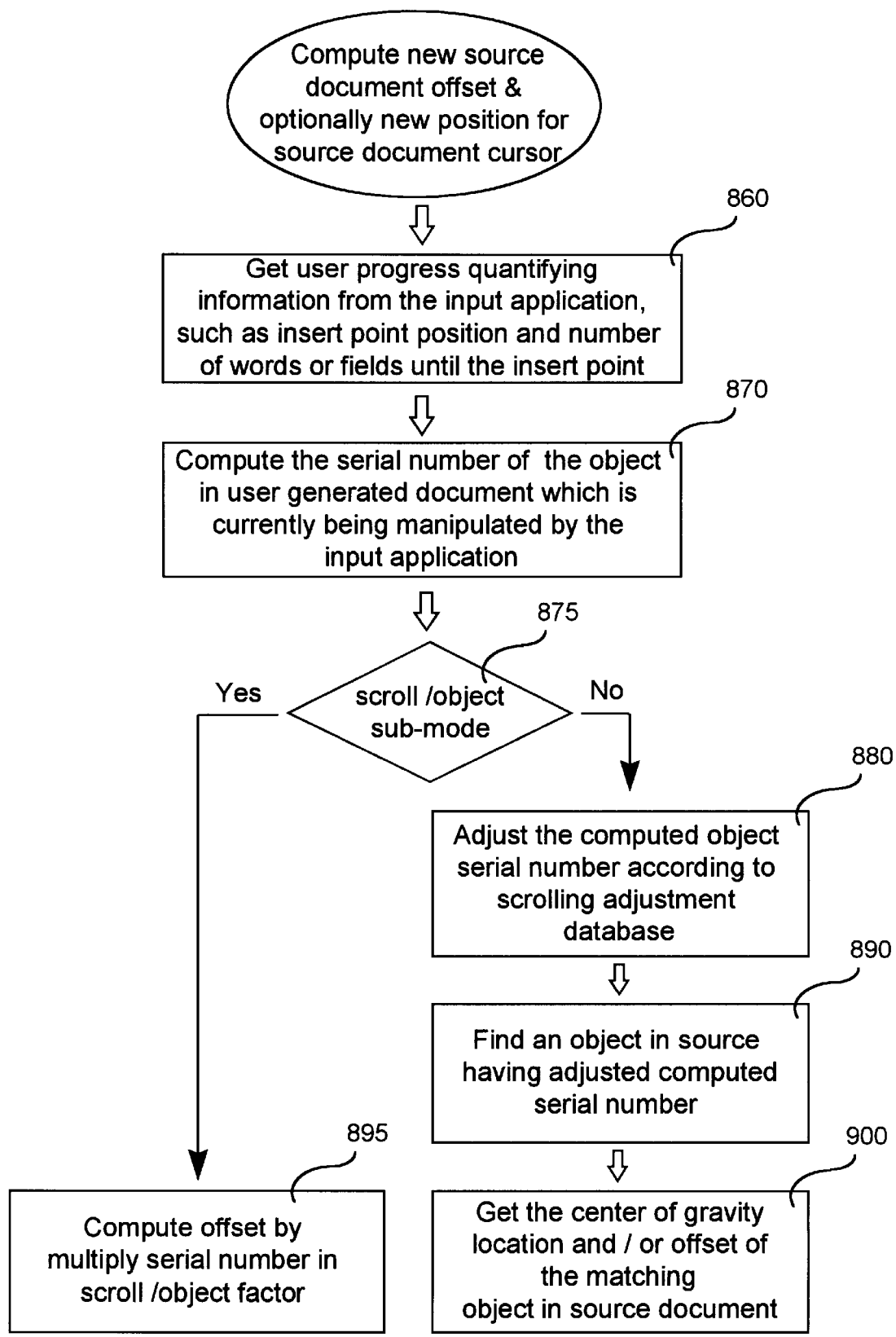
FIG. 13 is a simplified flowchart illustration of a preferred method for performing the image cursor position and scrolling offset computation step of FIG. 12 for the source document.

FIG. 13 is a simplified flowchart illustration of a preferred method for performing the source document offset and image cursor position computation step 800 of FIG. 12.

In step 860, information is obtained from the input application which quantifies the amount of user progress within the user-generated document. Optionally, the information also includes additional information regarding the user's progress such as the content of the object in the user-generated document which is currently being processed or the data structure element, within a known data structure, which is currently being processed. Typically, this information is derived at least partly from information generated by the method of FIG. 10B.

In step 870, the serial number of the current object in the user-generated document is computed by any suitable method, as described below with reference to FIG. 14A. Typically, the method by which the serial number is computed depends on the synchronization sub-mode.

In decision step 875, if the system is in scroll/object factor sub-mode, the method proceeds to step 895. Otherwise, the method proceeds to step 880.

In step 880, the serial number of the current object in the user-generated document, as computed by step 870, is adjusted using the scrolling adjustment database updated in step 1300 of FIG. 1B. The scrolling adjustment database, as shown in FIGS. 21A–21C, typically stores a correction, either zero or non-zero, for each object in the source document (e.g. for each word in the word list of FIG. 18 and for each line in the line list of FIG. 18). In step 880, the appropriate correction is accessed and executed, e.g., in the illustrated embodiment, by summing.

Provision of a scrolling adjustment database as shown has the advantage of allowing different correction values to be used for different portions of the user-generated document.

In step 890, an object is found in the source document which has the adjusted serial number, using the landmark database (FIG. 24) if the system is in landmark sub-mode or using the object list otherwise. Step 890 is described below in detail with reference to FIG. 14B.

Once the appropriate source document object has been identified, the object list is used to access the center of gravity location of the object and/or the offset of the matching object in the source document (step 900).

In step 895, the system computes the scrolling offset for the source document by multiplying the number of objects in the user generated document up to the insertion point, by the scroll/object factor. Step 895 optionally does not include computation of a new source document cursor position since the inaccuracy of the data may not allow this to be done at a reasonable level of accuracy.

FIG. 14A is a simplified flowchart illustration of a preferred method for computing the serial number of the current object in the user-generated document for each of eight different synchronization sub-modes.

Word to word, landmark, object-scroll factor and between-language sub-modes (step 1010): The serial number of the current object (word) in the user generated document is computed by counting words from the beginning of the user-generated document until the insertion point. If the sub-mode is the between-language factor sub-mode, the number of words is multiplied (step 1053) by the between-language factor to obtain the serial number of the current word in the user generated document. Otherwise, the number of words equals the serial number of the current object.

OCR sub-mode (step 1020): In OCR sub-mode, the object list (FIG. 18) is generated, as for the other sub-modes, in accordance with the method of FIG. 2, except that an additional field, "OCR", is added in which is stored the characters included in each word-object, as determined by conventional OCR techniques.

To find the serial number of the current object in the source document, the word in which the insertion point of the user generated document is located is searched for in the object list by searching through the OCR fields in the object list. If the word is found to appear only once in the object list, the serial number of the entry at which the word is found is the desired serial number. If the word appears in more than one entries of the object list, then the "correct" entry is taken to be the entry whose serial number is closest to the serial number of the current word in the user-generated document.

Translating sub-mode (step 1030): The serial number of the current object (word) is computed by translating the text of the user generated document up till the insertion point into the language of the source document and counting the number of words in the translated text.

Between line and line-to-line sub-modes (step 1040): The serial number of the current object (line) may be computed by monitoring the user's use of the new-line ("enter") key or by monitoring other events which indicate new lines.

FIG. 14B is a preferred method for performing step 890 in FIG. 13 in which an object in the source document is found which has a particular serial number, i.e. which matches a particular object in the user generated document.

As shown in FIG. 13, step 890 is not performed in scroll/object sub-mode.

In between line and line to line sub-modes (step 1098), the desired object (line) in the source document is the line in the line list (FIG. 18) which has the adjusted serial number (step 1104).

In the word-to-word, OCR, translating and between-language factor sub-modes (step 1094), the desired object (word) in the source document is the word in the word list (FIG. 18) which has the adjusted serial number.

In landmark sub-mode (step 1090), the desired object (text portion) in the source document is the record in the landmark database (FIG. 24) whose input limits include the adjusted serial number (step 1100). The term "input limits" is used to indicate the serial numbers of the first and last words in the text portion of a particular record in the landmark database.

FIG. 15A is an example of a screen display generated by a information sequence synchronization and display system constructed and operative in accordance with a preferred embodiment of the present invention which system is particularly suited to facilitating the process of typing handwritten documents. As shown, the display includes two windows, one of which (the lower window in the illustrated embodiment) displays a conventional interface with the input application including a display of the vicinity of the cursor (step 1150) in the user generated document. The other window (the upper window in the illustrated embodiment) displays an interface with the tracking and scrolling system of the present invention preferably including:

a. a display of the source document vicinity corresponding to the displayed user generated document vicinity; and b. a cursor indicating the source document location 1152 corresponding to the current insertion point 1150 in the user generated document. Typically the source document location 1152 comprises an object whose serial number matches the serial number of the object at which the current insertion point 1150 is located.

FIG. 15B is an example of a subsequent display generated by the same system after the user has typed the word "scanning" and has begun typing the next word, "device". As shown, the tracking/scrolling system of the present invention has scrolled forward one line because the system has identified, by tracking, that the current word "device" is on a new line in the source document, i.e. the line after the line in which the word "scanning" appears. Similarly, the source document cursor 1152 has moved from the word "scanning" to the word "device".

FIG. 15C is an example of a subsequent display generated by the system of FIGS. 15A and 15B for an example in which the insertion point 1150 has been moved back, by the user, to a earlier location within the user-generated document in order to correct existing text. As shown, the tracking/scrolling system of the present invention has scrolled backward in the source document to the location corresponding to the insertion point in the user-generated document. Also, the system has moved the source document cursor 1152 to the word which is being corrected in the user-generated document. The backward scrolling and backward cursor movement in the source document occur because the system has identified, by tracking, the backward scrolling which has occurred in the user-generated document.

Figure 16A:
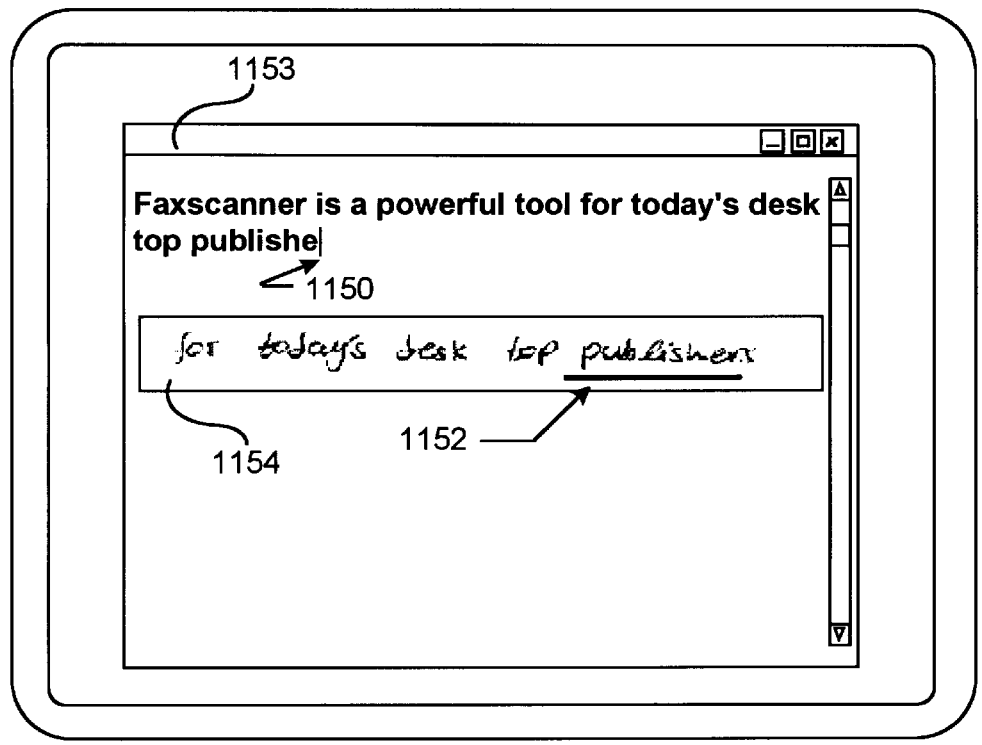
FIG. 16A is an example of a screen display generated by a system constructed and operative in accordance with another embodiment of the present invention.

FIG. 16A is an example of a screen display generated by a system constructed and operative in accordance with another embodiment of the present invention. As shown, the display includes two windows, one of which 1153 (the background window in the illustrated embodiment) displays a conventional interface with the input application including a display of the vicinity of the cursor (step 1150) in the user generated document. The other window 1154 (the bottom window in the illustrated embodiment) is a foreground window within the above-referenced background window which preferably is constantly displayed under the current insertion point. The foreground window 1154 displays an interface with the tracking and scrolling system of the present invention preferably including:

a. a display of the source document vicinity corresponding to the displayed user generated document vicinity. In the illustrated embodiment the source document vicinity includes only a single line, however this is not necessarily the case. Preferably, the user is prompted, during the pre-setting step described above with reference to FIG. 9, to determine the number of lines in the foreground window 1154; and b. a cursor indicating the source document location 1152 corresponding to the current insertion point 1150 in the user generated document. Typically the source document location 1152 comprises an object whose serial number matches the serial number of the object at which the current insertion point 1150 is located.

Figure 16B:
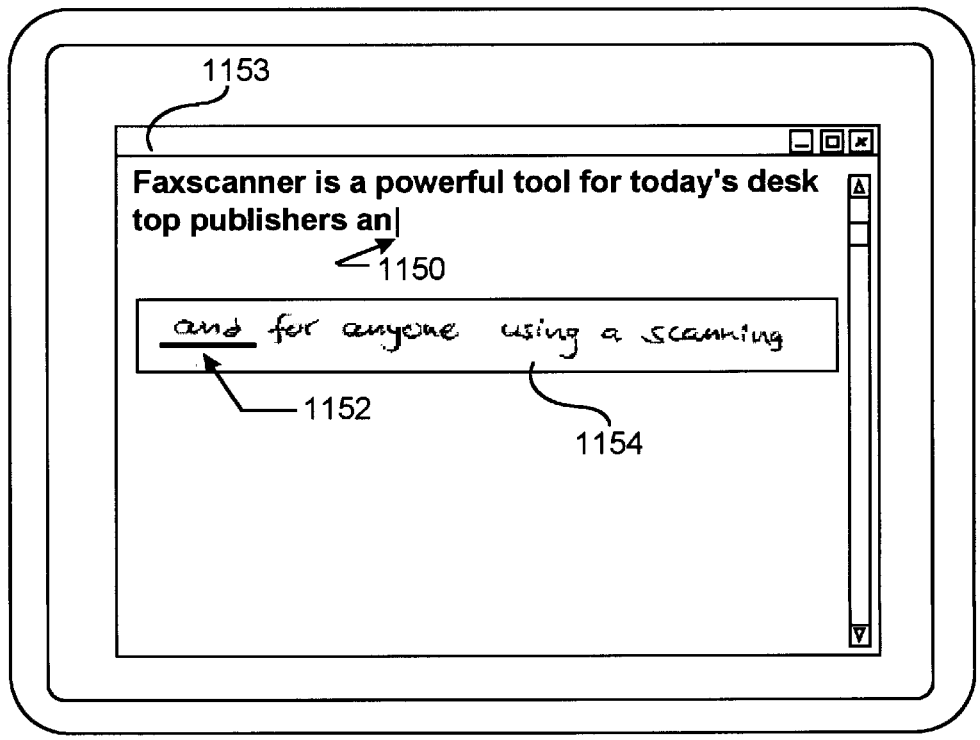
FIG. 16B is an example of a subsequent display generated by the same system after the user has typed the word "publishers" and has begun typing the next word, "and"

FIG. 16B is an example of a subsequent display generated by the same system after the user has typed the word "publishers" and has begun typing the next word, "and". As shown, the tracking/scrolling system of the present invention has scrolled forward one line because the current word "and" is on a new line in the source document, i.e. the line after the line in which the word "publishers" appears. Also, the source document cursor 1152 has moved from the word "publishers" to the word "and".

Figure 17A:
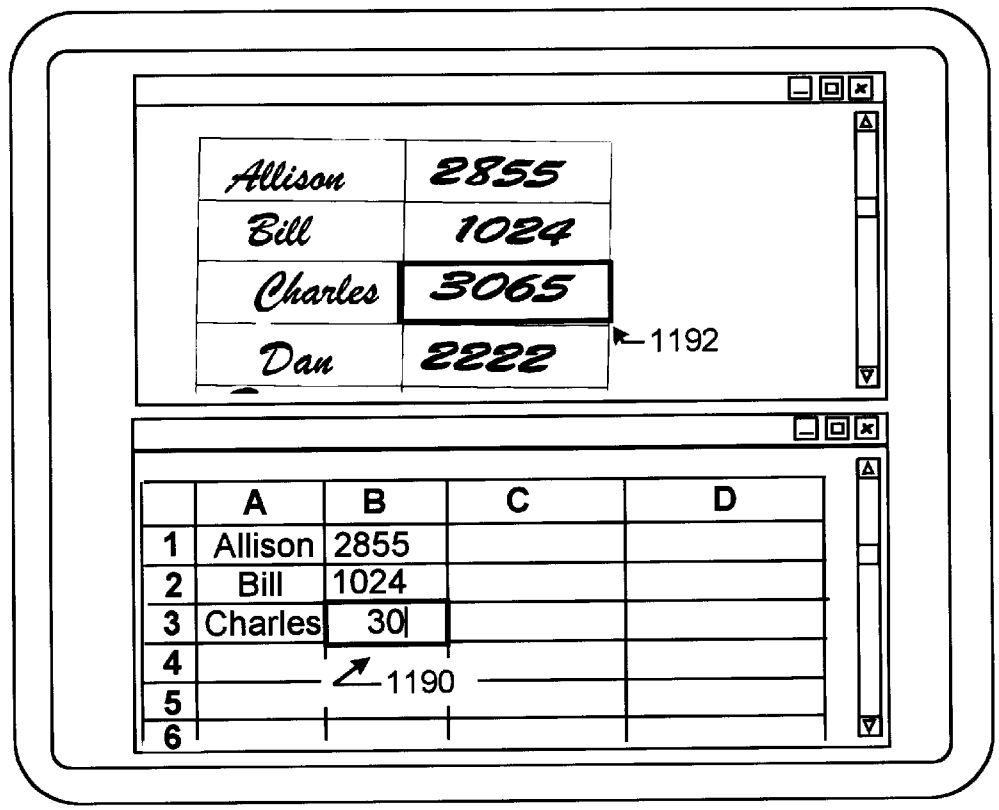
FIG. 17A is an example of a screen display generated by a information sequence synchronization and display system constructed and operative in accordance with a preferred embodiment of the present invention which system is particularly suited to facilitating the process of generating spreadsheets.

FIG. 17A is an example of a screen display generated by a information sequence synchronization and display system constructed and operative in accordance with a preferred embodiment of the present invention which system is particularly suited to facilitating the process of generating spreadsheets. As shown, the display includes two windows, one of which (the lower window in the illustrated embodiment) displays a conventional interface with the input (spreadsheet) application including a display of the vicinity of the cursor in the user generated spreadsheet document. The other window (the upper window in the illustrated embodiment) displays an interface with the tracking and scrolling system of the present invention preferably including:

a. a display of the source document vicinity corresponding to the displayed user generated document vicinity; and b. a cursor indicating the source document location 1192 corresponding to the current cell 1190 in the user generated document, typically the cell at which the spreadsheet application cursor is located. Typically the source document location 1192 comprises an object whose serial number matches the serial number of the current cell in the spreadsheet application. In this embodiment, an ordering is defined between the cells of the spreadsheet, e.g. an ordering which proceeds along the rows, and along the columns within each row, such that a serial number may be defined for each spreadsheet cell.

Figure 17B:
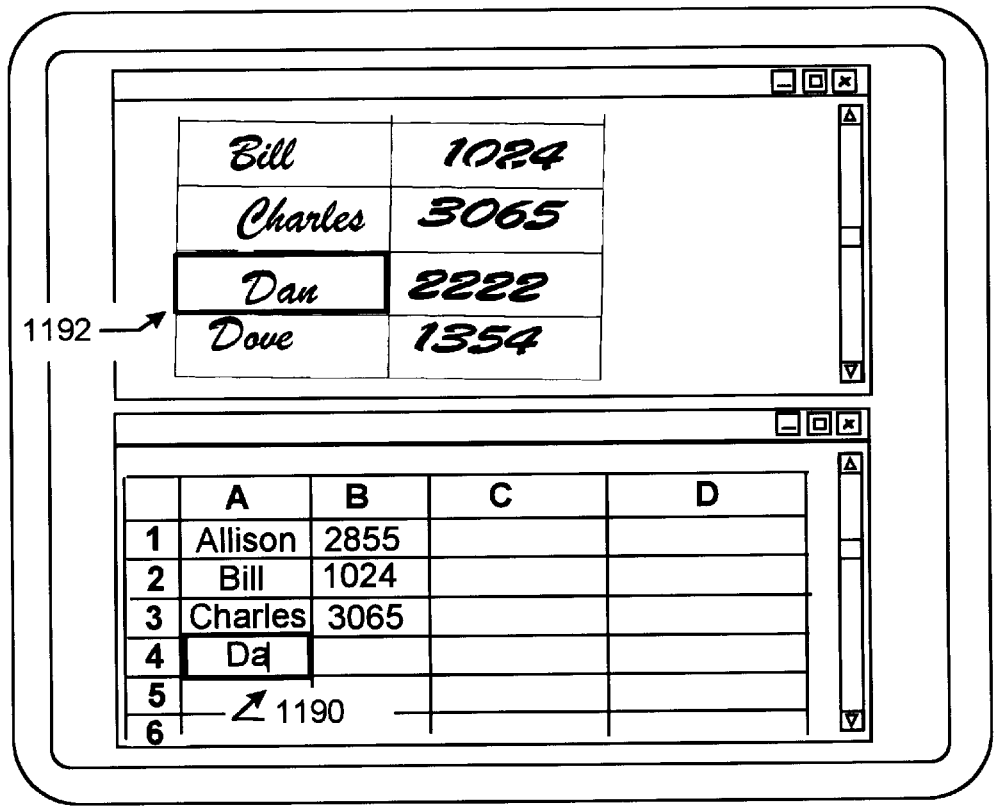
FIG. 17B is an example of a subsequent display generated by the same system after the user has typed "3065" and has begun typing "Dan" in the next cell.

FIG. 17B is an example of a subsequent display generated by the same system after the user has typed "3065" in a current cell and has begun typing "Dan" in a subsequent cell. As shown, the tracking/scrolling system of the present invention has scrolled forward one line because the system has identified, by tracking, that the current cell (in which "Dan" appears) is on a new line in the source document, i.e. the line after the line which includes the cell in which "3065" appears. The current cell is the cell in which the insertion point 1190 is located. Also, the source document cursor 1192 has moved from the cell in which "3065" appears to the cell in which the word "Dan" appears.

Figures 19, 20:
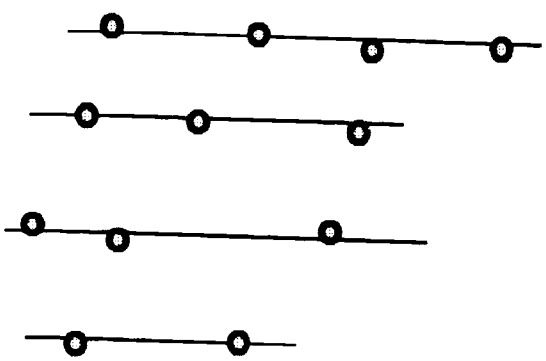
FIG. 19 is a pictorial illustration of a handwriting sample.
FIG. 20 is a graph of the centers of gravity of the objects (words) in the handwriting sample of FIG. 19 and of a set of best-fit lines for the centers of gravities.

FIG. 18 is a pictorial illustration of the contents of source document image database 60 for an handwriting sample, illustrated in FIG. 19. The database of FIG. 18 typically includes an object list and an attribute list. The object list stores the locations of each object identified in the source document. The attribute list stores general attributes of the source document, typically including attributes which apply to all objects in the source document, which attributes are learned as described above with reference to FIG. 6B.

For example, as illustrated, the object list may include a word list and a line list, as described in detail below. This embodiment assumes that the system is operative to identify two types or levels of objects (words and lines) and that the system is operative to impose a model of parallel lines on the source document. It is appreciated that other embodiments may differ in one or both respects. For example, in a spreadsheet embodiment, only one level of objects (cells) may be identified. Alternatively, three types of objects may be identified (cells, rows and columns).

As shown in FIG. 19, the handwriting sample includes 12 words which are generally arranged in four lines, such that the first line includes the first 4 words, the second line includes the next 3 words, the third line includes the next 3 words and the fourth line includes two words.

The method of FIG. 5 identifies the 12 objects (words) and generates the object list of FIG. 18 except for the last field which is "line #". In the illustrated example, the following information is stored for each of the 12 objects:

a. The coordinates of the top left hand and bottom right hand corners of a rectangle, preferably a minimum rectangle, circumscribing the object;

b. The coordinates of the center of gravity (Cx,Cy) for each object, as computed by step 370 of FIG. 6A. FIG. 20 is a graph of the centers of gravity of the objects (words) in the handwriting sample of FIG. 19 and of a set of best-fit lines for the centers of gravities.

c. The offset of each object, e.g. the number of bytes from the beginning of the source document image-to-display file 70 to the first bit of the circumscribing rectangle.

The method of FIG. 6A identifies a set of parallel lines which best fit the objects of FIGS. 19–20 in the sense of maximizing the sum of squares of the number of objects per line. Information regarding the set of lines is preferably stored in source document image database 60, as illustrated in FIG. 18, both in the "line #" field of the object list of FIG. 18 and in the line list of FIG. 18. The "line #" field stores the line in which each object belongs, as determined by the method of FIG. 6A. The line list stores the skew or slope__ of the parallel lines and, for each line:

a. the coordinates of each line's two endpoints, e.g. the starting point (xs, ys) and the finish point (xf,yf); and b. the offset of each line, e.g. the number of bytes from the beginning of the source document image-to-display file 70 to the first bit of that line.

The attribute list, in the present example, stores the results obtained in FIG. 6B, step 2372 in "lines distance" fields and the results obtained in FIG. 6B, step 2382 in "objects distance" fields.

It is appreciated that the source document attributes which are learned are a function of the application and the particular attributes which are illustrated as being learned in FIG. 6B and stored in the database of FIG. 18 are merely exemplary and are not intended to be limiting. Similarly, the exact parameters stored in the object list in FIG. 18 are also merely exemplary and are not intended to be limiting, since the object list of FIG. 18 generally stores locations of objects within the source document, the exact parameters of these locations being a function of the application.

FIG. 21A is a diagram of an adjustment database in its initial state i.e. before any corrections are made e.g. in step 1300 of FIG. 11B.

FIG. 21B is a diagram of the adjustment database of FIG. 21A after a user has requested that the source document cursor position be corrected by advancing one object forward, from Object No. 5 to the user's present location at Object No. 6.

FIG. 21C is a diagram of the adjustment database of FIG. 21B after a user has made an additional source document cursor position correction request, namely that the cursor advance one more object forward, from Object No. 10 to the user's present location at Object No. 11.

Figure 22A:
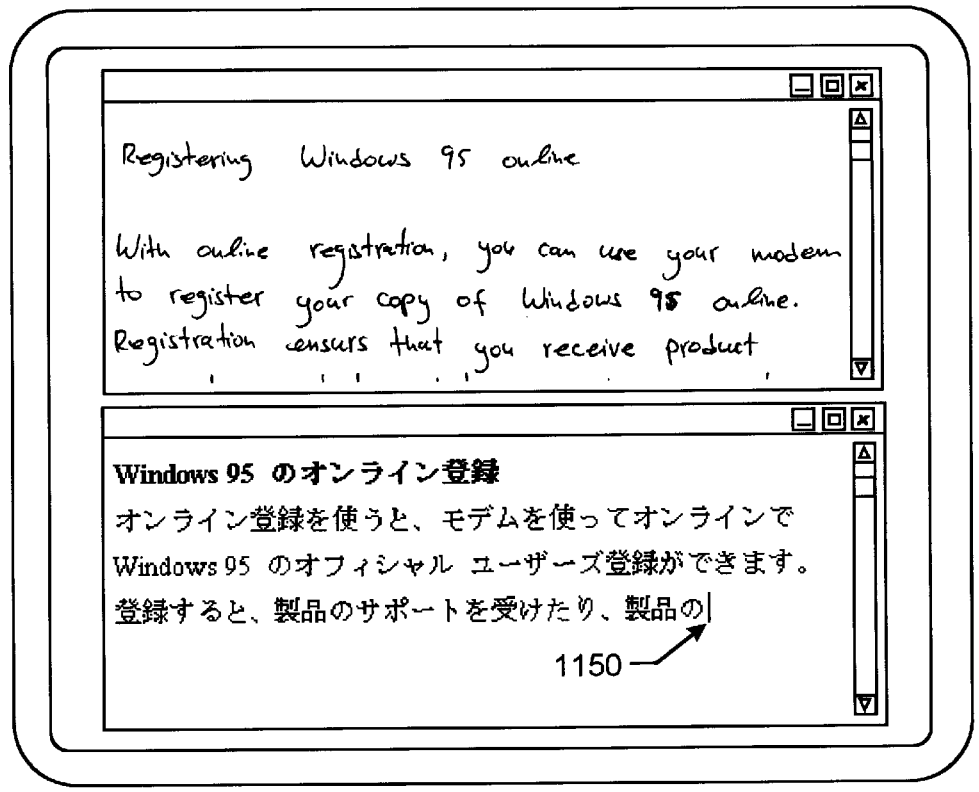
FIG. 22A is a screen display generated by a system constructed and operative in accordance with a preferred embodiment of the present invention, when operating in the translating or between-language factor sub-modes.
Figure 22B:
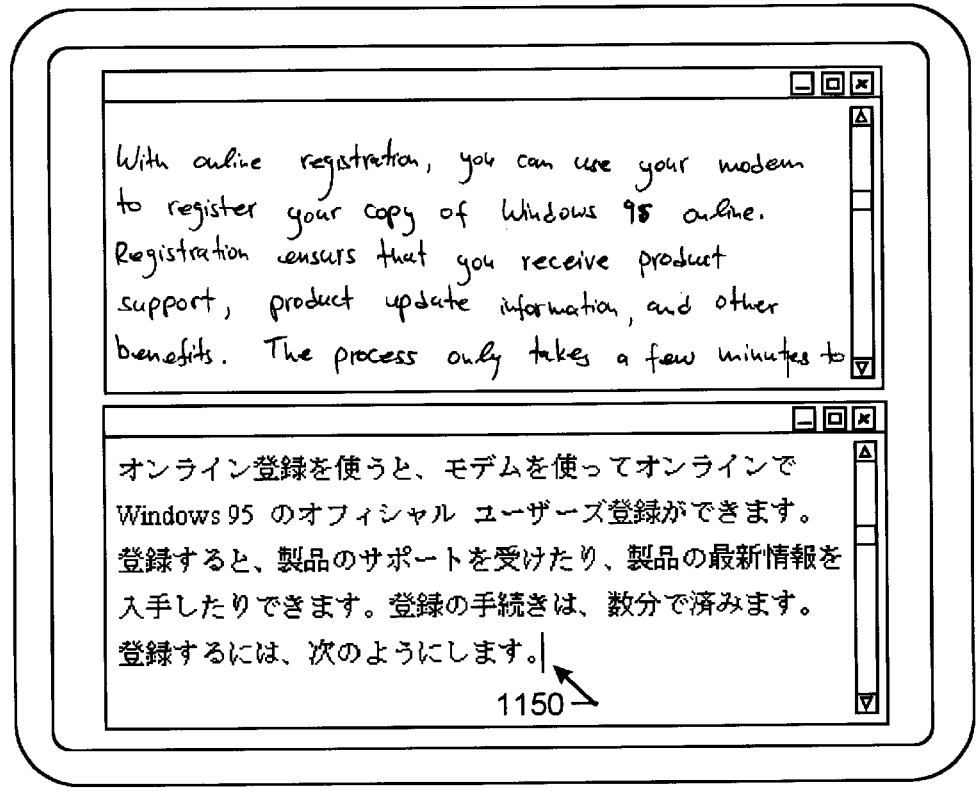
FIG. 22B is an example of a subsequent screen display generated by the system of FIG. 22A after the user has finished typing the cursor row of the document to be translated and has begun typing the next row of the document to be translated.

FIG. 22A is a screen display generated by a system constructed and operative in accordance with a preferred embodiment of the present invention, when operating in the translating or between-language factor sub-modes. The source document is in handwritten English which is to be translated into Japanese. The source document may for example have been faxed from a remote location. The user-generated document is in Japanese and the window displaying the user-generated document is under the window displaying the source document. As is apparent when FIGS. 22A and 22B are compared, as the user progresses within the user-generated document, the system detects this progress by tracking and the source document is scrolled accordingly.

Reference is now made to FIGS. 23A–23C.

FIG. 23A is an example of a screen display generated by an information sequence synchronization and display system constructed and operative in accordance with a preferred embodiment of the present invention which system is operating in Between Line sub-mode. As shown, the system is operative to display a portion of a source document and, between the lines thereof, portions of the user-generated document.

FIG. 23B is an example of a subsequent display generated by the system of FIG. 23A after the user has finished processing one line of the source document and has begun inputting the next line of the source document. The current user-generated line is displayed adjacent to the current source document line, typically in the space between the current source document line and the next source document line, as described above with reference to step 834 of FIG. 12. In the illustrated example, the current line in FIG. 23A is "Faxscanner is a powerful tool", whereas the current line in FIG. 23B is "for today's desk top publishers". Therefore, the insertion point in FIG. 23A is under the source document line "Faxscanner is a powerful tool". As the user progresses, the system tracks this progress, determines that a line has been completed in the user-generated document and moves the insertion point to the next between-line space. Therefore, in FIG. 23B, the insertion point is under the source document line "for today's desk top publishers".

FIG. 23C is an example of a subsequent screen display generated by the system of FIG. 23A after the user has finished working, wherein the user-generated document has been separated from the source document, typically by identifying and collecting user-generated objects and transferring these objects to a new file. Alternatively, source document objects may be identified and deleted and the remaining information may be stored.

Any suitable computational method may be employed to localize between-line spaces. For example, the line list in the image database of FIG. 18 includes the line's endpoint coordinates and therefore the interval between the coordinates of adjacent lines in the database may be considered a between-line space.

FIG. 25 is an illustration of a hand-written sample.

Appendix A is a computer listing of source code in Borland compatible "C" language, which can be turned into an executable file that runs on a PC, under DOS Version 3 or later.

The code of Appendix A creates, in accordance with a preferred embodiment of the present invention, an improved word processing tool in which an image of the source document is displayed at the top of the screen, and a text editor window appears at the bottom of screen. As text is typed, the apparatus of Appendix A monitors the user's typing and displays the relevant part of the original image. In order to create the executable file:

a. Copy the source code to a Borland editor, and then compile it as a DOS executable application (2win.exe). Detailed instructions are in the Borland user guide.

b. Create an image file under a new name, sample.pcx. To do this, create an image representation of a handwriting sample such as that illustrated in FIG. 25 in a PCX format (1 bpp; 100 dpi), e.g. by scanning the handwriting sample.

c. Create an empty text file entitled "text.txt".

d. Copy the created executable file, the empty text file and the image file to a new directory c:\2win in the hard drive, in addition to the egavga.bgi file, which is part of the Borland environment.

e. The executable file can be run with the command line c:\2win\win.exe image.pcx. The system executes the processes described with reference to element 50 in FIG. 1C, and then displays the source document image at the top part of the screen, and a text editor at the bottom part of the screen. When the user begins typing text in the editor at the bottom window, the application executes tracking and scrolling processes, as described above with reference to element 80 of FIG. 1C. When typing is completed, the text can be saved by selecting Save from the Options menu. To finish working on the application, select "Exist" from the Options menu.

The present invention has a wide variety of applications including but not limited to synchronizing texts in different languages for translation purposes, synchronizing texts for word processing or proofreading purposes, and other data input applications. It is appreciated that uses of the term "typing" and the like are intended merely as examples and alternatively, any suitable mode of input may be used such as mouse or voice.

In structured data input applications such as spreadsheets and databases, the present invention may be useful in transferring data from sheets into computerized form. For example, each field within a plurality of identically formatted forms relating to a plurality of records and appearing on a plurality of sheets may be regarded as an object. Each such object includes handwritten information. All of the sheets may be scanned and the system of the present invention is then able to display, sequentially, a selected field in each of the sheets, thereby to facilitate entry of data into the selected field for each of a plurality of records.

It is appreciated that the invention shown and described herein is suitable for synchronizing a first text in a first language to a second text comprising a translation of the first text into a second language. For example, in word-for-word translation, in which it is generally the case that a single word in the first language is translated into a single word in the second language, word tracking can be used. Even in non-word for word applications word tracking may be useful although less exact, if the ratio of the number of words in the first language used to express a given concept to the number of words in the second language used to express the same concept is roughly constant. The term "word tracking" refers to tracking in which the user is regarded as progressing through a sequence of objects, wherein each object is a word. The objective of word tracking is to provide a continuous indication of the word at which the user is currently located.

It is appreciated that the software components of the present invention may, if desired, be implemented in ROM (read-only memory) form. The software components may, generally, be implemented in hardware, if desired, using conventional techniques.

It is appreciated that the particular embodiment described in the Appendices is intended only to provide an extremely detailed disclosure of the present invention and is not intended to be limiting.

It is appreciated that various features of the invention which are, for clarity, described in the contexts of separate embodiments may also be provided in combination in a single embodiment. Conversely, various features of the invention which are, for brevity, described in the context of a single embodiment may also be provided separately or in any suitable subcombination.

It will be appreciated by persons skilled in the art that the present invention is not limited to what has been particularly shown and described hereinabove. Rather, the scope of the present invention is defined only by the claims that follow:

What is claimed is:

1. A method for automatically tracking and synchronizing images displayed on a screen, the method comprising:
    simultaneously displaying on screen:
        a scanned image; and
        a corresponding typed-in image;
    automatically tracking a user's position within a first one of said images; and
    synchronizing the other image to the first image by displaying on the screen a position within the other image corresponding to said user's position within the first image.

2. A method according to claim 1 wherein said synchronizing step comprises scrolling the other one of said images to a position corresponding to said user's position.

3. A method according to claim 1 wherein said first one of said images comprises the scanned image and said other one of said images comprises the typed-in image.

4. A method according to claim 1 wherein said first one of said images comprises the typed-in image and said other one of said images comprises the scanned image.

5. A method according to claim 1 wherein said synchronizing step comprises identifying a position corresponding to said user's position without relying on recognition of content within said images.

6. A method according to claim 1 wherein said synchronizing step comprises image processing the scanned image to identify therewithin page layout elements and identifying a corresponding position to be displayed based on said page layout elements.

7. A method according to claim 6 wherein said step of identifying a corresponding position comprises identifying the corresponding position using said page layout elements as landmarks.

8. Apparatus for automatically tracking and synchronizing images displayed on a screen, the apparatus comprising:
    a simultaneous two-image display operative to simultaneously display on screen:
        a scanned image; and
        a corresponding typed-in image; and
    an automatic tracker operative to automatically track a user's position within a first one of said images; and
    a synchronizer operative to synchronize the other image to the first image by displaying on the screen a position within the other image corresponding to said user's position within the first image.

9. Apparatus according to claim 8 wherein said scanned image comprises a scanned image of an original document.

10. Apparatus according to claim 9 wherein said typed-in image comprises an image of a typed-in document.

11. Apparatus according to claim 9 wherein said scanned image of an original document comprises a scanned image of a handwritten text and said corresponding typed-in image comprises a word-processed version of said handwritten text.

12. Apparatus according to claim 8 wherein the scanned image comprises a scanned-in sequence of elements and the typed-in image comprises a matching typed-in sequence of elements.

13. Apparatus according to claim 12 wherein the tracker is operative to generate information regarding the user's current location in an individual one of said sequences, and wherein the synchronizer is operative:
    to receive said information,
    to identify a matching location, within she other of said sequences, which matches said current location, and
    to display the matching location.

14. Apparatus according to claim 8 wherein said synchronizer is operative to receive an indication of the user's position within th first image and to identify a corresponding position in the second image.

15. Apparatus according to claim 13 wherein the synchronizer is operative to identify said matching location by counting elements within the other of said sequences.

16. Apparatus according to claim 15 wherein said elements comprise words.

17. Apparatus according to claim 15 wherein said elements comprise letters.

18. Apparatus according to claims 15 wherein said elements comprise sets of characters.

19. Apparatus according to claim 18 wherein each of said sets of characters comprises a line.

20. Apparatus according to claim 18 wherein each of said sets of characters comprises a paragraph.

21. Apparatus according to claim 18 wherein each of said sets of characters comprises a field and wherein each said sequence of information elements comprises a spreadsheet.

22. Apparatus according to claim 13 and wherein the synchronizer is operative:
    to receive a corrective input instruction from the user, and
    to identify a matching location by adjusting an estimate of the user's current location to take into account said corrective input instruction.

23. Apparatus according to claim 8 and wherein th tracker is operative to automatically track a user's progress in processing a user-generated document; and wherein the synchronizer is operative to synchronize the scanned image by displaying on the screen ion within the scanned image corresponding to the user's progress in processing the user-generated document.

* * * * *

UNITED STATES PATENT AND TRADEMARK OFFICE
CERTIFICATE OF CORRECTION

PATENT NO. : 6,072,461
DATED : June 6, 2000
INVENTOR(S) : Yossi Haran (Osman)

It is certified that errors appear in the above-identified patent and that said Letters Patent is hereby corrected as shown below:

Title page, [76] Inventors: Change "Yossi Haran" to -- Yossi Haran (Osman) --.

Signed and Sealed this

Third Day of April, 2001

Attest:

NICHOLAS P. GODICI

Attesting Officer     Acting Director of the United States Patent and Trademark Office